US011800486B2

(12) United States Patent
Manolakos et al.

(10) Patent No.: US 11,800,486 B2
(45) Date of Patent: Oct. 24, 2023

(54) DYNAMIC UPDATE OF QUALITY OF SERVICE (QOS) PARAMETERS DURING AN ONGOING NEW RADIO (NR) POSITIONING SESSION

(71) Applicant: QUALCOMM Incorporated, San Diego, CA (US)

(72) Inventors: Alexandros Manolakos, Escondido, CA (US); Weimin Duan, San Diego, CA (US); Jay Kumar Sundararajan, San Diego, CA (US); Hwan Joon Kwon, San Diego, CA (US); Krishna Kiran Mukkavilli, San Diego, CA (US); Wanshi Chen, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 17/344,109

(22) Filed: Jun. 10, 2021

(65) Prior Publication Data

US 2021/0410102 A1 Dec. 30, 2021

Related U.S. Application Data

(60) Provisional application No. 63/045,735, filed on Jun. 29, 2020.

(51) Int. Cl.
*H04W 64/00* (2009.01)
(52) U.S. Cl.
CPC ................ *H04W 64/006* (2013.01)
(58) Field of Classification Search
CPC ........... H04W 72/042; H04W 74/0833; H04W 72/1289; H04W 72/0413; H04W 4/02;
(Continued)

(56) References Cited

U.S. PATENT DOCUMENTS

| 2011/0028165 A1* | 2/2011 | Ni ........................... H04W 4/02 455/456.2 |
| 2016/0050534 A1* | 2/2016 | Lim ...................... H04W 64/00 370/252 |
| 2018/0054795 A1 | 2/2018 | Edge | |

FOREIGN PATENT DOCUMENTS

| WO | WO 0152569 | 7/2001 |
| WO | WO 2019032997 | 2/2019 |

OTHER PUBLICATIONS

"3rd Generation Partnership Project, Technical Specification Group Radio Access Network, Evolved Universal Terrestrial Radio Access (E-UTRA), LTE Positioning Protocol (LPP) (Release 15)", 3GPP Standard, Technical Specification, 3GPP TS 36.355, 3rd Generation Partnership Project (3GPP), Mobile Competence Centre, 650, Route Des Lucioles, F-06921 Sophia-Antipolis Cedex, France, vol. RAN WG2, No. V15.5.0, Sep. 30, 2019 (Sep. 30, 2019), pp. 1-224, XP051785102, Retrieved from the Internet: URL: https://www.3gpp.org/ftp/Specs/archive/36_series/36.355/36355-f50.zip 36355-f50.docx [retrieved on Sep. 30, 2019], Clauses 4.3.5-5.5.3, p. 28, p. 49-p. 50, p. 15, p. 53.

(Continued)

Primary Examiner — Kwasi Karikari
(74) Attorney, Agent, or Firm — Weaver Austin Villeneuve & Sampson LLP

(57) ABSTRACT

In at least one embodiment, a user equipment (e.g., a mobile device) may receive a location request message from a server (e.g., a Location Management Function), wherein the location request message identifies a plurality of Quality of Service parameters for the LTE Positioning Protocol (LPP) positioning session. In at least one embodiment, the user equipment may receive a selection of one or more Quality of Service parameters for the LPP positioning session. In at least one embodiment, the user equipment may configure the user equipment according to the one or more selected (Continued)

Quality of Service parameters. In at least one embodiment, the user equipment may generate a location response message according to the selected QoS parameters. The user equipment may send the location response message to the server. A UE can select the QoS parameters during communication with a server and/or with a second UE via sidelink communications.

35 Claims, 11 Drawing Sheets

(58) Field of Classification Search
CPC ......... H04W 28/0268; H04W 72/1284; H04W 72/12; H04W 36/32; H04W 72/08; H04W 8/205; H04W 28/0967; H04W 12/03; H04W 4/027; H04W 28/0958; H04W 36/0044
See application file for complete search history.

(56) References Cited

OTHER PUBLICATIONS

International Search Report and Written Opinion—PCT/US2021/036919—ISA/EPO—dated Oct. 6, 2021.

* cited by examiner

DYNAMIC UPDATE OF QUALITY OF SERVICE (QOS) PARAMETERS DURING AN ONGOING NEW RADIO (NR) POSITIONING SESSION

RELATED APPLICATIONS

This application claims the benefit of U.S. Provisional Application No. 63/045,735, filed Jun. 29, 2020, entitled "TECHNIQUES FOR DYNAMIC UPDATE OF QUALITY OF SERVICE (QOS) PARAMETERS DURING AN ONGOING NEW RADIO (NR) POSITIONING SESSION," which is assigned to the assignee hereof, and incorporated by reference herein in its entirety.

BACKGROUND

Long Term Evolution (LTE) Positioning Protocol (LPP) techniques provide for determining a location of a mobile electronic device (referred to herein as a User Element (UE)). The position can be provided to a sever or to another UE. The LPP techniques provide for selection of one or more Quality of Services (QoS) parameters for the positioning techniques. Under current procedures, selection of one or more of the QoS parameters requires that the positioning session be re-initiated. This re-initiation of the positioning session results in latency.

SUMMARY

According to some implementations, a method may include receiving a location request message from a server, wherein the location request message identifies a plurality of Quality of Service (QoS) parameters for the LPP positioning session; receiving a selection of one or more QoS parameters for the LPP positioning session; configuring the user equipment according to the one or more selected QoS parameters; generating a location response message; and sending the location response message to the server.

An example method of dynamically configuring one or more Quality of Service (QoS) parameters during a positioning session performed at a user equipment (UE), according to this disclosure, comprises receiving a location request message from a network entity, wherein the location request message identifies the one or more QoS parameters selectable for the positioning session. The method also comprises obtaining a selection of the one or more QoS parameters for the positioning session. The method also comprises sending a location response message to the network entity, wherein, the location response message is: generated based at least in part on the selected QoS parameters, and indicative of a configuration of the UE, the configuration made in accordance with the one or more selected QoS parameters.

An example method of dynamically configuring one or more Quality of Service (QoS) parameters during a positioning session performed at a network entity, according to this disclosure, comprises sending a location request message from the network entity to a user equipment (UE), wherein the location request message identifies the one or more QoS parameters selectable for the positioning session. The method also comprises obtaining a selection of the one or more QoS parameters for the positioning session. The method also comprises receiving a location response message to the network entity, wherein, the location response message is: generated based at least in part on the selected QoS parameters, and indicative of a configuration of the UE, the configuration made in accordance with the one or more selected QoS parameters.

An example user equipment (UE) for dynamically configuring one or more Quality of Service (QoS) parameters during a positioning session, according to this disclosure, comprises a transceiver, a memory, one or more processors communicatively coupled with the transceiver and the memory, wherein the one or more processors are configured to receive, via the transceiver, a location request message from a network entity, wherein the location request message identifies the one or more QoS parameters selectable for the positioning session. The one or more processing units are further configured to obtain a selection of the one or more QoS parameters for the positioning session. The one or more processing units are further configured to send, via the transceiver, a location response message to the network entity, wherein, the location response message is: generated based at least in part on the selected QoS parameters, and indicative of a configuration of the UE, the configuration made in accordance with the one or more selected QoS parameters.

An example network entity for dynamically configuring one or more Quality of Service (QoS) parameters during a positioning session, according to this disclosure, comprises a transceiver, a memory, one or more processors communicatively coupled with the transceiver and the memory, wherein the one or more processors are configured to send, via the transceiver, a location request message from the network entity to a user equipment (UE), wherein the location request message identifies the one or more QoS parameters selectable for the positioning session. The one or more processing units are further configured to obtain a selection of the one or more QoS parameters for the positioning session. The one or more processing units are further configured to receive, via the transceiver, a location response message to the network entity, wherein, the location response message is: generated based at least in part on the selected QoS parameters, and indicative of a configuration of the UE, the configuration made in accordance with the one or more selected QoS parameters.

An example apparatus for dynamically configuring one or more Quality of Service (QoS) parameters during a positioning session, according to this disclosure, comprises means for receiving a location request message from a network entity, wherein the location request message identifies the one or more QoS parameters selectable for the positioning session. The apparatus further comprises means for obtaining a selection of the one or more QoS parameters for the positioning session. The apparatus further comprises means for sending a location response message to the network entity, wherein, the location response message is: generated based at least in part on the selected QoS parameters, and indicative of a configuration of a user equipment (UE), the configuration made in accordance with the one or more selected QoS parameters.

An example apparatus for dynamically configuring one or more Quality of Service (QoS) parameters during a positioning session, according to this disclosure, comprises means for sending a location request message from a network entity to a user equipment (UE), wherein the location request message identifies the one or more QoS parameters selectable for the positioning session. The apparatus further comprises means for obtaining a selection of the one or more QoS parameters for the positioning session. The apparatus further comprises means for receiving a location response message to the network entity, wherein, the location response message is: generated based at least in part on the selected QoS parameters, and indicative of a configuration of the UE, the configuration made in accordance with the one or more selected QoS parameters.

According to this disclosure, an example non-transitory computer-readable medium stores instructions for dynamically configuring one or more Quality of Service (QoS) parameters during a positioning session, the instructions comprising code for receiving a location request message from a network entity, wherein the location request message identifies the one or more QoS parameters selectable for the positioning session. The instructions further comprise code for obtaining a selection of the one or more QoS parameters for the positioning session. The instructions further comprise code for sending a location response message to the network entity, wherein, the location response message is: generated based at least in part on the selected QoS parameters, and indicative of a configuration of the a user equipment (UE), the configuration made in accordance with the one or more selected QoS parameters.

According to this disclosure, an example non-transitory computer-readable medium stores instructions for dynamically configuring one or more Quality of Service (QoS) parameters during a positioning session, the instructions comprising code for sending a location request message from a network entity to a user equipment (UE), wherein the location request message identifies the one or more QoS parameters selectable for the positioning session. The instructions further comprise code for obtaining a selection of the one or more QoS parameters for the positioning session. The instructions further comprise code for receiving a location response message to the network entity, wherein, the location response message is: generated based at least in part on the selected QoS parameters, and indicative of a configuration of the UE, the configuration made in accordance with the one or more selected QoS parameters.

These and other embodiments are described in detail below. For example, other embodiments are directed to systems, devices, and computer readable media associated with methods described herein.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Like reference, symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc., or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION OF THE DRAWINGS

The following detailed description of example implementations refers to the accompanying drawings. The same reference numbers in different drawings may identify the same or similar elements.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

Figure 1:
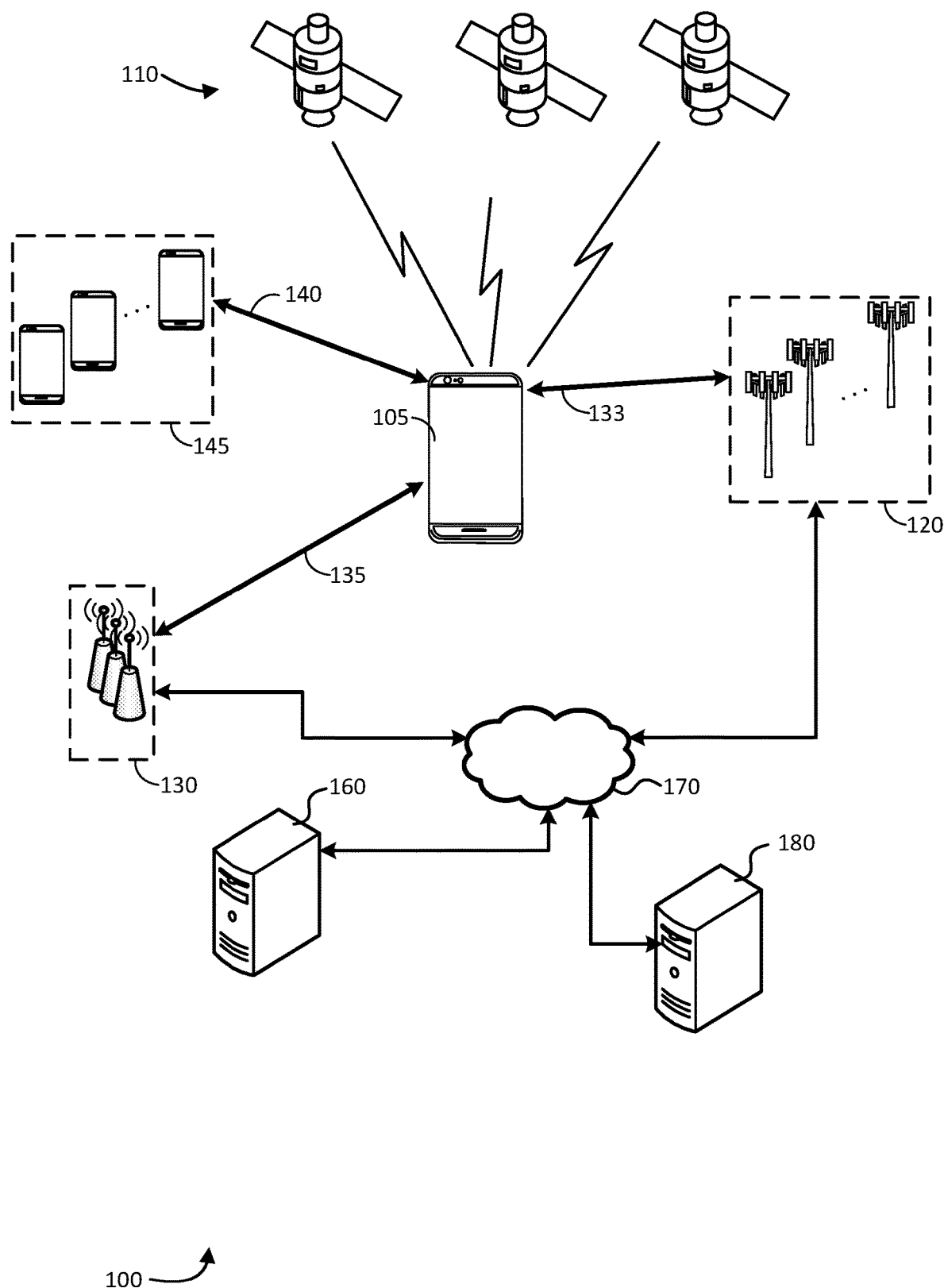
FIG. 1 is a simplified illustration of a positioning system according to an embodiment of the disclosure.

FIG. 1 is a simplified illustration of a positioning system 100 in which a UE 105, location server 160, and/or other components of the positioning system 100 can use the techniques provided herein for determining an estimated location of UE 105, according to an embodiment. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 are communicatively coupled to the network 170. In some embodiments, the base station 120 may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP, for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other UEs 145, which may be mobile or fixed. When or more other UEs 145 are used in the position determination of a particular UE 105, the UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location or some other location such as a location for UE 105 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

Figure 2:
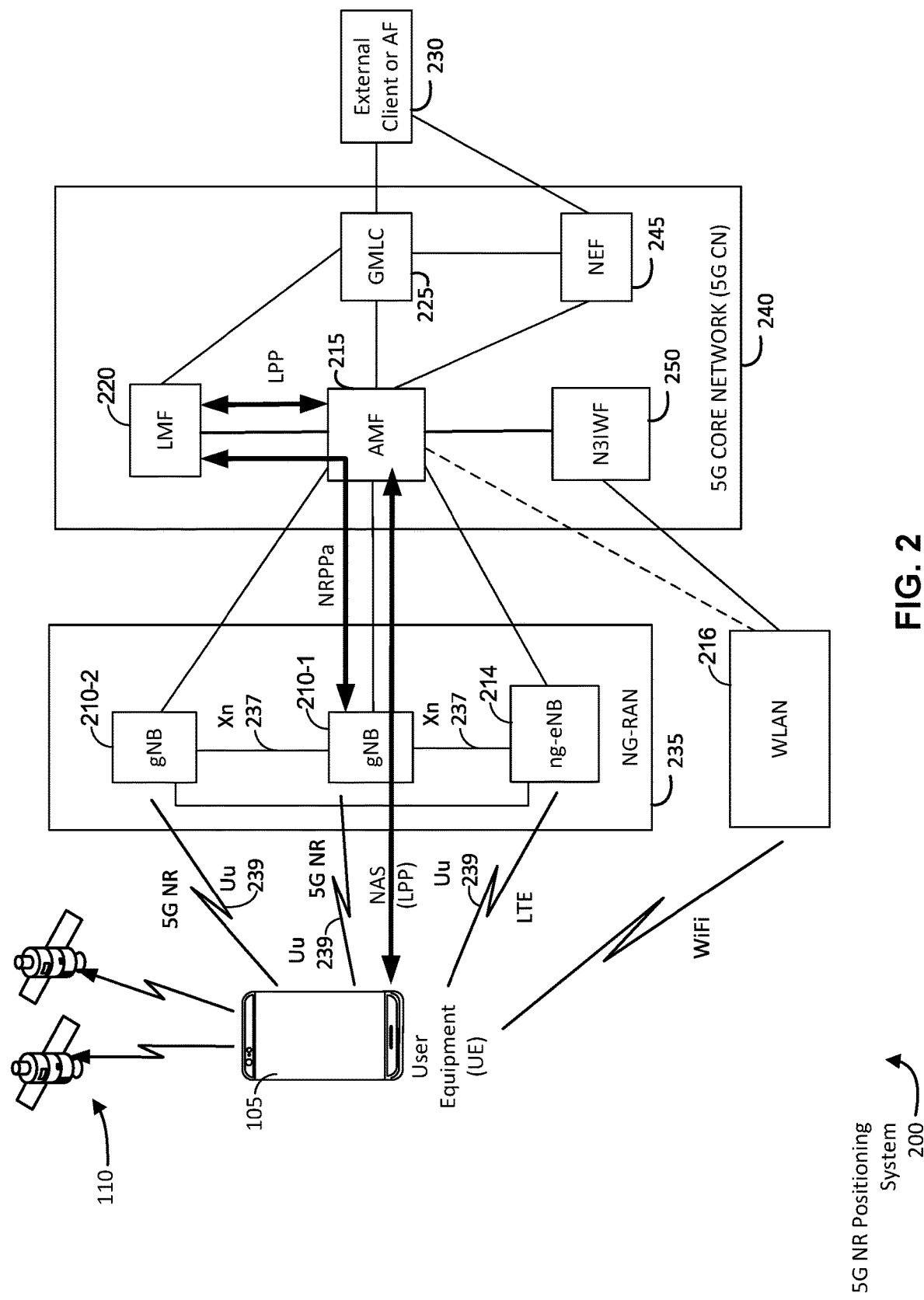
FIG. 2 is a diagram of an example communication system that may utilize a 5G network to determine a position for a mobile device, according to an embodiment.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes 210, 214, 216 (which may correspond with base stations 120 and access points 130 of FIG. 1) and (optionally) an LMF 220 (which may correspond with location server 160) to implement one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. The 5G NR positioning system 200 may further utilize information from GNSS satellites 110 from a GNSS system like Global Positioning System (GPS) or similar system (e.g. GLONASS, Galileo, Beidou, Indian Regional Navigational Satellite System (IRNSS)). Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and comprise a Transmission Reception Point (TRP), and may include NRNodeB (gNB) 210-1 and 210-2 (collectively and generically referred to herein as gNBs 210) and/or an antenna of a gNB). Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes.

As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node 210, 214, or 216 of a first RAT to an access node 210, 214, or 216 of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.445. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAoA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD or AoA.

Information provided by the gNBs 210 and/or ng-eNB 214 to the LMF 220 using New Radio Positioning Protocol (NRPPa) may include timing and configuration information for PRS transmission and location coordinates. The LMF 220 can then provide some or all of this information to the UE 105 as assistance data in an LPP message via the NG-RAN 235 and the 5GCN 240.

An LPP message sent from the LMF 220 to the UE 105 may instruct the UE 105 to do any of a variety of things, depending on desired functionality. For example, the LPP message could contain an instruction for the UE 105 to obtain measurements for GNSS (or A-GNSS), WLAN, OTDOA and/or ECID (or some other position method). In the case of OTDOA, the LPP message may instruct the UE 105 to obtain one or more measurements (e.g., reference signal time difference (RSTD) measurements) of PRS signals transmitted within particular cells supported by particular gNBs 210 and/or ng-eNB 214 (or supported by some other type of base station such as an eNB or Wi-Fi AP). An RSTD measurement may comprise the difference in the times of arrival at the UE 105 of a signal (e.g., a PRS signal) transmitted or broadcast by one gNB 210 and a similar signal transmitted by another gNB 210. The UE 105 may send the measurements back to the LMF 220 in an LPP message (e.g., inside a 5G NAS message) via the serving gNB 210-1 (or serving ng-eNB 214) and the AMF 215.

As noted, while the communication system 200 is described in relation to 5G technology, the communication system 200 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GCN 240 may be configured to control different air interfaces. For example, in some embodiments, both the NG-RAN 235 and the 5GCN 240 may be replaced by other RANs and other core networks. For example, in an EPS, the NG-RAN 235 may be replaced by an E-UTRAN containing eNBs and the 5GCN 240 may be replaced by an EPC containing a Mobility Management Entity (MME) in place of the AMF 115, an E-SMLC in place of the LMF 220 and a GMLC that may be similar to the GMLC 225. In such an EPS, the E-SMLC may use LPPa in place of NRPPa to send and receive location information to and from the eNBs in the E-UTRAN and may use LPP to support positioning of UE 105. In these other embodiments, generic positioning procedures and methods for a UE 105 could be supported in an analogous manner to that described herein for a 5G network with the difference that functions and procedures described herein for gNBs 210, ng-eNB 214, AMF 215 and LMF 220 could, in some cases, apply instead to other network elements such eNBs, Wi-Fi APs, an MME and an E-SMLC.

To support certain position methods such as OTDOA and transmission or PRS or other signals used in positioning of a UE 105, base stations may be synchronized. In a synchronized network, the transmission timing of gNBs 210 may be synchronized such that each gNB 210 has the same transmission timing as every other gNB 210 to a high level of precision—e.g., 50 nanoseconds or less. Alternatively, the gNBs 210 may be synchronized at a radio frame or subframe level such that each gNB 210 transmits a radio frame or subframe during the same time duration as every other gNB 210 (e.g., such that each gNB 210 starts and finishes transmitting a radio frame or subframe at almost precisely the same times as every other gNB 210), but does not necessarily maintain the same counters or numbering for radio frames or subframes. For example, when one gNB 210 is transmitting a subframe or radio frame with counter or number zero (which may be the first radio frame or subframe in some periodically repeated sequence of radio frames or subframes), another gNB 210 may be transmitting a radio frame or subframe with a different number or counter such as one, ten, one hundred etc.

Synchronization of the transmission timing of ng-eNBs 214 in NG-RAN 235 may be supported in a similar manner to synchronization of gNBs 210, although since ng-eNBs 214 may typically use a different frequency to gNBs 210 (to avoid interference), an ng-eNB 214 may not always be synchronized to gNBs 210. Synchronization of gNBs 210 and ng-eNBs 214 may be achieved using a GPS receiver or a GNSS receiver in each gNB 210 and ng-eNB 214 or by other means such as using the IEEE 1588 Precision Time Protocol.

Figure 3:
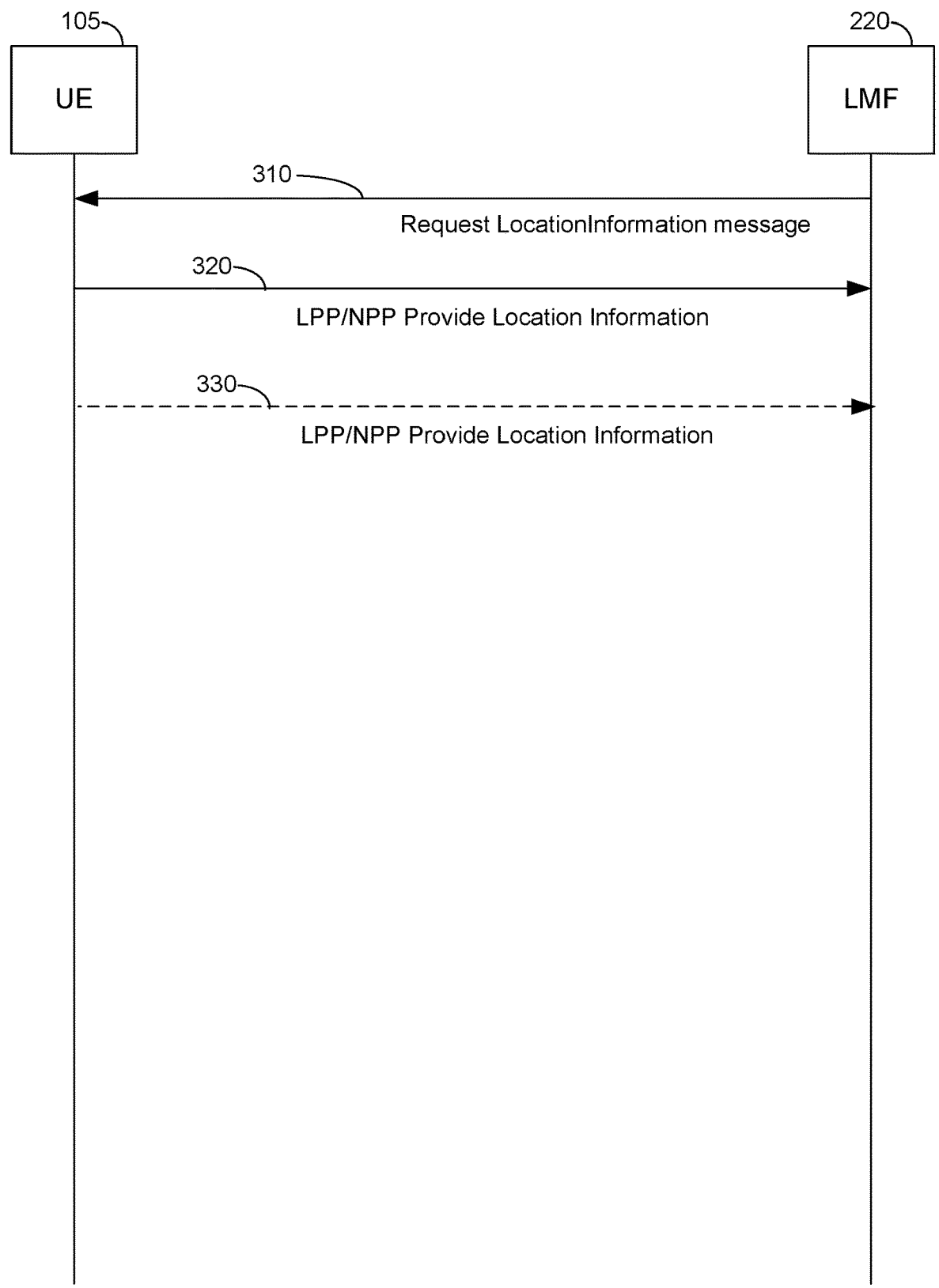
FIG. 3 illustrates a simplified example information exchange for a LPP positioning session.

FIG. 3 illustrates a simplified information exchange for a LPP positioning session. An LPP session is used between a Location Server and the target device in order to obtain location related measurements or a location estimate or to transfer assistance data. A single LPP session is used to support a single location request (e.g., for a single Mobile Terminal-Location Request (MT-LR), Mobile-Originating Location Request (MO-LR) or network induced location request (NI-LR). Multiple LPP sessions can be used between the same endpoints to support multiple different location requests (as required by TS 23.271).

Each LPP session comprises one or more LPP transactions, with each LPP transaction performing a single operation (capability exchange, assistance data transfer, or location information transfer). In E-UTRAN and NG-RAN, the LPP transactions are realized as LPP procedures.

The instigator of an LPP session can instigate the first LPP transaction, but subsequent transactions may be instigated by either end. LPP transactions within a session may occur serially or in parallel. LPP transactions are indicated at the LPP protocol level with a transaction ID in order to associate messages with one another (e.g., request and response).

LPP procedures are not required to occur in any fixed order, in order to provide greater flexibility in positioning. Thus, a UE may request assistance data at any time in order to comply with a previous request for location measurements from the LW; an LMF may instigate more than one request for location information (e.g., measurements or a location estimate) in case location results from a previous request were not adequate for the requested QoS; and the target device may transfer capability information to the server at any time if not already performed.

Despite the flexibility allowed by LPP, it is expected that procedures will normally occur in the following order: (1) Capability Transfer, (2) Assistance Data Transfer, and (3) Location Information Transfer (measurements and/or location estimate).

Positioning procedures in the NG-RAN are modelled as transactions of the LPP protocol using the procedures defined in this specification. A procedure consists of a single operation of one of the following types: exchange of positioning capabilities, transfer of assistance data, transfer of location information (positioning measurements and/or position estimate), error handling, or abort.

During a positioning session, e.g., UE has received a "request location", and is supposed to send back a "Provide location" message.

As shown in FIG. 3, a server, e.g., LMF 220, sends, at 310, a RequestLocationInformation message to a target, e.g., a UE 105. The RequestLocationInformation message can indicate the type of location information needed. In various embodiments, the RequestLocationInformation message can indicate one or more QoS parameters for the requested location information.

At 320, the UE 105 sends a ProvideLocationInformation message to the LMF 220 to transfer location information. The location information transferred should match or be a subset of the location information requested in step 310 unless the LMF 220 explicitly allows additional location information. If step 330 does not occur, this message can be set the endTransaction IE to TRUE.

If requested in step 320, the target sends additional ProvideLocationInformation messages to the server to transfer location information. The location information transferred should match or be a subset of the location information requested in step 310 unless the LMF 220 explicitly allows additional location information. The last message can include the endTransaction IE set to TRUE.

During the positioning session as illustrated in FIG. 3, the QoS parameters can be updated prior to each LPP positioning session. If the UE 105 is configured for the updated QoS parameters, the LPP positioning session needs to be re-initiated. The re-initiation creates undesirable latency in the positioning system.

Certain circumstances can require higher levels of accuracy during LPP positioning sessions. For example, an autonomous vehicle can turn from a residential street into a crowded parting lot. The parting lot likely requires higher levels of horizontal accuracy to accuracy maneuver the vehicle into a parking space. Higher levels of accuracy for positioning can require increased processing requirements, radio receiver resources, or power resources. Other circumstances can exist where the UE 105 is entering a power saving mode and cannot meet the QoS parameters during the power saving mode. Techniques for dynamic LPP positioning sessions allow a user to adjust one or more QoS parameters without the inherent latency of starting a new LPP positioning session and re-configuring everything.

Figure 4:
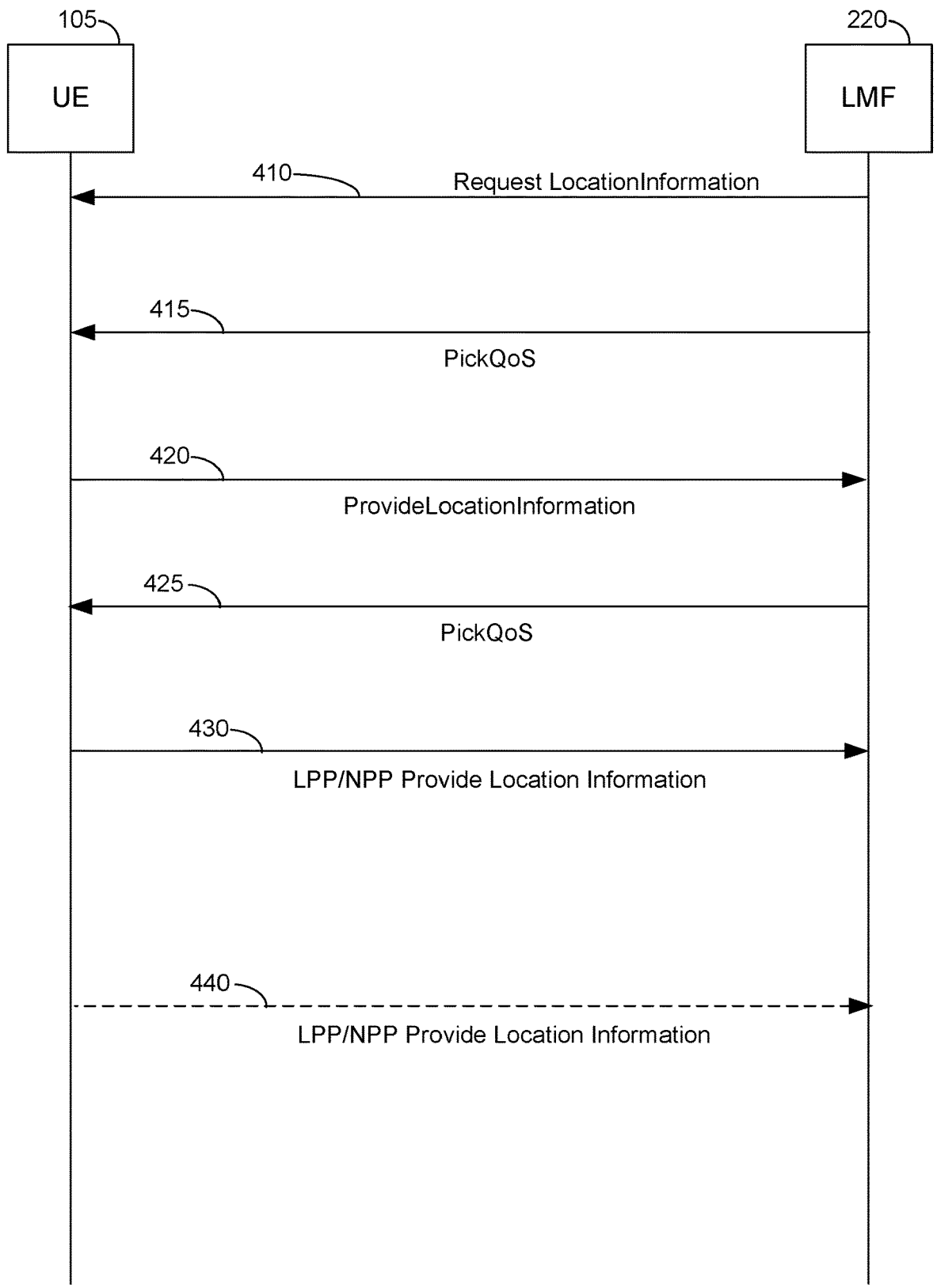
FIG. 4 illustrates an example information exchange for a dynamic LPP positioning session.

FIG. 4 illustrates an example information exchange for a dynamic LPP positioning session. The UE 105 can send updated UE capabilities or can send UE capabilities with a Timer expiration, or UE capabilities that can be different for different duration of the positioning session. The LMF 220 can send an updated "request Location" and/or updated "assistance data." All of this can be done prior to when the UE 105 is expected to send back a new/additional/updated "provide Location" response message.

In a dynamic LPP position session, the UE can be configured to meet the updated QoS capabilities during the LPP positioning session. The LPP positioning session does not need to be re-initiated thereby saving any latency required for re-initiating. At 410, the LMF 220 can send, at 410, a location request message to the UE 105 to request location information. The location request message can indicate the type of location information needed and provide either (1) one or more associated QoS parameters selectable for the positioning session or (2) no QoS parameter indication. Some embodiments may include a third option in which the location request message includes a notice that QoS parameters may be adjusted during the LPP positioning session, without an indication of the one or more associated QoS parameters.

For option (1) the LMF 220 may indicate the QoS parameters that have the potential to be adjusted during the LPP positioning session. In addition QoS parameters, some embodiments may allow for the LMF 220 to optionally enumerate one or more possible values for one or more of the QoS parameters. For example, the LMF 220 may include, in the location request message sent at 410 a QoS parameter, responseTime, and may further indicate that a value for the QoS parameter may be selected from the set consisting of: {100 ms, 1 sec, 10 sec}. Subsequently, the LMF 220 may send another message to the UE 105 (e.g., a selection indication at 415, discussed below), that the value 100 ms is selected. By indicating QoS parameters and (optionally) one or more values for one or more of the QOS parameters, embodiments allow a UE 105 to budget its processing and power resources accordingly.

Under option (2) the QoS parameters are set for the LPP positioning session without the option of being adjusted during the LPP positioning session.

The UE 105 can receive a message from a server (e.g., LMF 220). The server or serving gNB 220 as shown in FIG. 2 can send, at 415, a first message that indicates a selection of one or more of the QoS parameters. Alternatively, the server (e.g., LMF 220) or serving gNB can configure a fully new QoS Request. The determination of the QoS can occur with download control information (DCI) or can occur Medium Access Control (MAC) commands (low-level reporting). At 420, the UE 105 can send a response message to the server (e.g., LMF 220) that includes the requested location information according the updated QoS parameters. At 425, the UE 105 can receive a second message that indicates a selection of one or more of the QoS parameters. The QoS parameters can be the same as the parameters selected in the first message. For example, the server may request an increase in horizontal accuracy for a dense parking area and at some point later, e.g., while the vehicle is on the highway, the server may request a decrease in horizontal accuracy to save on system resources because the high level of accuracy is no longer required on the highway as compared with a parking area. In some embodiments, the second message may indicate a selection of different parameters from the first message. At 435, the UE 105 can send a response message to the server (e.g., LMF 220) that includes the requested location information according the updated QoS parameters. At 440, the UE 105 can continue to send the requested location information.

The UE 105 can be configured with multiple values of the following QoS parameters horizontalAccuracy, verticalCoordinateRequest, verticalAccuracy, responseTime, velocityRequest, timeNB, horizontalAccuracyExt, and/or verticalAccuracyExt. These parameters are examples and not limiting. Additional QoS parameters that are not listed can be configured during the dynamic positioning session. In the case of measurements, some of the sub-fields can apply to the location estimate that could be obtained by the server from the measurements provided by the target device assuming that the measurements are the only sources of error. Depending on desired functionality, QoS parameters can comprise a number of sub-fields. Descriptions of the parameters are provided in the paragraphs that follow.

The HorizontalAccuracy parameter indicates the maximum horizontal error in the location estimate at an indicated confidence level. The "accuracy" can correspond to the encoded uncertainty as defined in TS 23.032 [15] and "confidence" can correspond to confidence as defined in TS 23.032 [15].

The VerticalCoordinateRequest parameter can indicate whether a vertical coordinate is required (TRUE) or not (FALSE).

The VerticalAccuracy parameter indicates the maximum vertical error in the location estimate at an indicated confidence level and is only applicable when a vertical coordinate is requested. The "accuracy" can correspond to the encoded uncertainty altitude as defined in TS 23.032 [15] and "confidence" can correspond to confidence as defined in TS 23.032 [15].

The responseTime parameter time indicates the maximum response time as measured between receipt of the RequestLocationInformation and transmission of a ProvideLocationInformation. If the unit field is absent, this is given as an integer number of seconds between 1 and 128. If the unit field is present, the maximum response time is given in units of 10-seconds, between 10 and 1280 seconds. If the periodicalReporting IE is included in CommonIEsRequestLocationInformation, this field should not be included by the location server and shall be ignored by the target device (if included).

A responseTimeEarlyFix parameter indicates the maximum response time as measured between receipt of the RequestLocationInformation and transmission of a ProvideLocationInformation containing early location measurements or an early location estimate. If the unit field is absent, this is given as an integer number of seconds between 1 and 128. If the unit field is present, the maximum response time is given in units of 10-seconds, between 10 and 1280 seconds. When this IE is included, a target should send a ProvideLocationInformation (or more than one ProvideLocationInformation if location information will not fit into a single message) containing early location information according to the responseTimeEarlyFix IE and a subsequent ProvideLocationInformation (or more than one ProvideLocationInformation if location information will not fit into a single message) containing final location information according to the time IE. A target can omit sending a ProvideLocationInformation if the early location information is not available at the expiration of the time value in the responseTimeEarlyFix IE. A server should set the responseTimeEarlyFix IE to a value less than that for the time IE. A target shall ignore the responseTimeEarlyFix IE if its value is not less than that for the time IE. The responseTimeEarlyFix parameter unit indicates the unit of the time and responseTimeEarlyFix fields. Enumerated value "tenseconds" corresponds to a resolution of 10 seconds. If this field is absent, the unit/resolution is 1 second.

The velocityRequest parameter indicates whether velocity (or measurements related to velocity) is requested (TRUE) or not (FALSE).

If the periodicalReporting IE or responseTime IE is included in CommonIEsRequestLocationInformation, this field should not be included by the location server and shall be ignored by the target device (if included). Dynamically adjusting QoS can be more important for periodic reporting because the LPP positioning session can continue until terminated (e.g., no discrete end time). At the initial configuration, the system can indicate potentially QoS configuration limits that may be requested during the LPP positioning session.

The timeNB parameter indicates the maximum response time as measured between receipt of the RequestLocationInformation and transmission of a ProvideLocationInformation. If the unit field is absent, this is given as an integer number of seconds between 1 and 512. If the unit field is present, the maximum response time is given in units of 10-seconds, between 10 and 5120 seconds.

The responseTimeEarlyFixNB parameter indicates the maximum response time as measured between receipt of the RequestLocationInformation and transmission of a ProvideLocationInformation containing early location measurements or an early location estimate. If the unit field is absent, this is given as an integer number of seconds between 1 and 512. If the unit field is present, the maximum response time is given in units of 10-seconds, between 10 and 5120 seconds. When this IE is included, a target should send a ProvideLocationInformation (or more than one ProvideLocationInformation if location information will not fit into a single message) containing early location information according to the responseTimeEarlyFixNB IE and a subsequent ProvideLocationInformation (or more than one ProvideLocationInformation if location information will not fit into a single message) containing final location information according to the timeNB IE. A target shall omit sending a ProvideLocationInformation if the early location information is not available at the expiration of the time value in the responseTimeEarlyFixNB IE. A server should set the responseTimeEarlyFixNB IE to a value less than that for the timeNB IE. A target shall ignore the responseTimeEarlyFixNB IE if its value is not less than that for the timeNB IE.

The unitNB parameter indicates the unit of the timeNB and responseTimeEarlyFixNB fields. Enumerated value 'ten-second' corresponds to a resolution of 10 seconds. If this field is absent, the unit/resolution is 1 second.

The horizontalAccuracyExt parameter indicates the maximum horizontal error in the location estimate at an indicated confidence level. The "accuracyExt" corresponds to the encoded high accuracy uncertainty as defined in TS 23.032 [15] and "confidence" corresponds to confidence as defined in TS 23.032 [15]. This field should not be included by the location server and shall be ignored by the target device if the horizontalAccuracy field is included in QoS.

The verticalAccuracyExt parameter indicates the maximum vertical error in the location estimate at an indicated confidence level and is only applicable when a vertical coordinate is requested. The "accuracyExt" corresponds to the encoded high accuracy uncertainty as defined in TS 23.032 [15] and "confidence" corresponds to confidence as defined in TS 23.032 [15]. This field should not be included by the location server and shall be ignored by the target device if the verticalAccuracy field is included in QoS.

All QoS requirements shall be obtained by the target device to the degree possible but it is permitted to return a response that does not fulfill all QoS requirements if some were not attainable. The single exception is time and timeNB which shall always be fulfilled—even if that means not fulfilling other QoS requirements.

A target device supporting NB-IoT access shall support the responseTimeNB IE. A target device supporting HA GNSS shall support the HorizontalAccuracyExt, VerticalAccuracyEx, and unit fields. A target device supporting NB-IoT access and HA GNSS shall support the unitNB field.

Having multiple values of the QoS parameters (or multiple QoS containers), may be applicable only for periodic positioning sessions (periodicalReporting is ON) or when the reportingAmount is set to "infinite/indefinite".

All QoS requirements may be obtained by the target device (e.g., UE 105) to the degree possible but the target device may return a response that does not fulfill all QoS requirements if some were not attainable. For example, if the LMF 220 selects a 5 meter horizontal accuracy and due to system or signal resources only a 10 meter horizontal accuracy is possible. The system may provide location data with the 10 meter horizontal accuracy. In various embodiments, the single exception may be time and timeNB which may be fulfilled—even if that means not fulfilling other QoS requirements.

Figure 5:
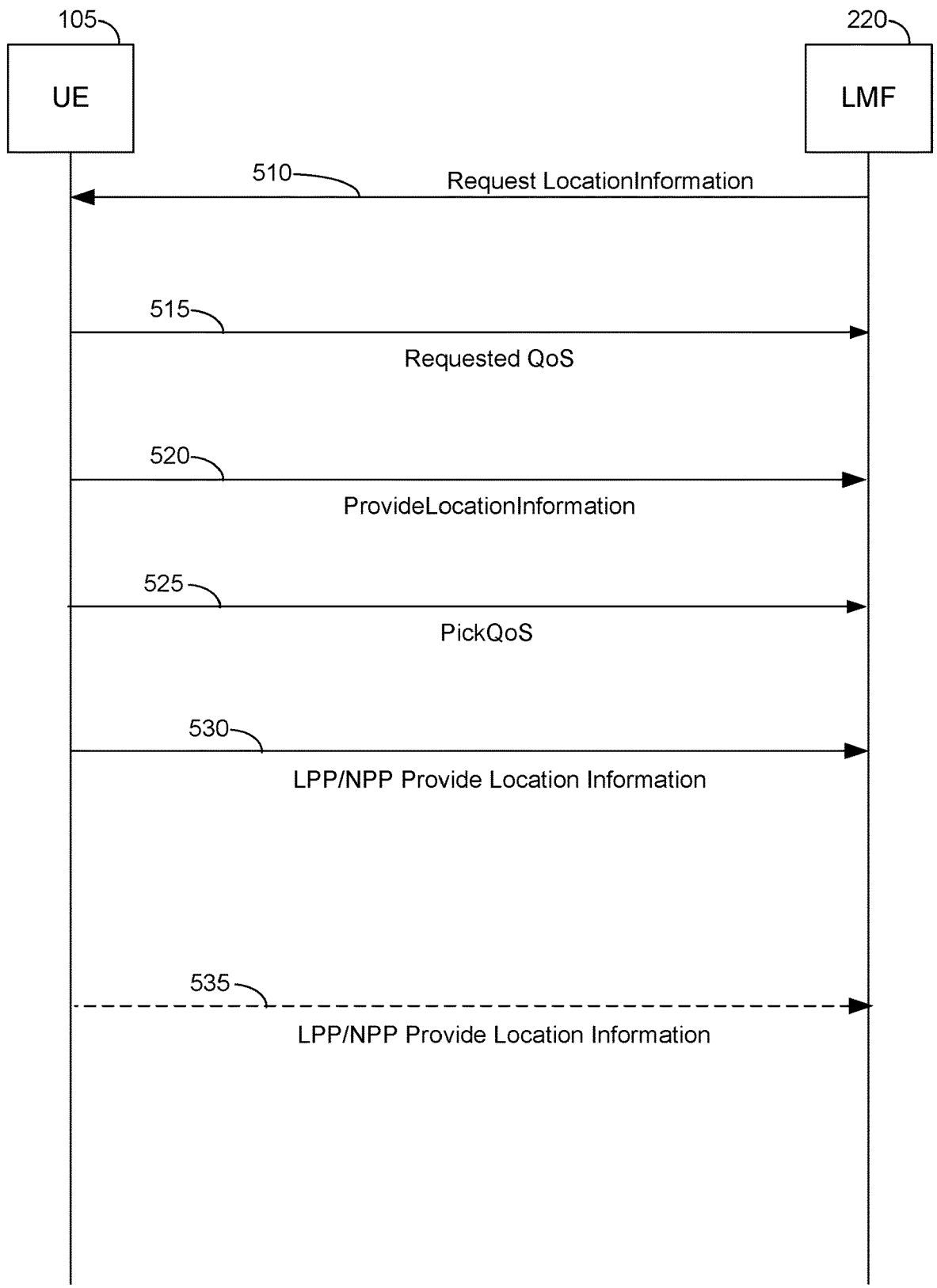
FIG. 5 illustrates a second example information exchange for a dynamic LPP positioning session.

FIG. 5 illustrates a second example information exchange for a dynamic LPP positioning session. Again, all QoS requirements may be obtained by the target device (e.g., UE 105) to the degree possible but the target device may return a response that does not fulfill all QoS requirements if some were not attainable. The single exception may be time and timeNB which may be fulfilled—even if that means not fulfilling other QoS requirements. The QoS parameters can include, for example: horizontalAccuracy, verticalCoordinateRequest, verticalAccuracy, responseTime, velocityRequest, timeNB, horizontalAccuracyExt, and/or verticalAccuracyExt, which can include information as described previously.

At 510, the UE 105 can receive a message from a server (e.g., LMF 220). The UE 105 can send, at 515, a first message to LMF 220 that indicates a requested set of one or more of the QoS parameters. In various embodiments, the server (i.e., LMF 220) can select QoS parameters based on the requested one or more QoS parameter indicated by the UE 105 at the message set at 515, and may further include the selection in a responsive message to the UE 105, (not shown), which may occur with download control information (DCI) or can occur Medium Access Control (MAC) Control Element (CE) commands (low-level reporting). In various embodiments, a DCI type of request can be within the same slot or half millisecond. In various embodiments, a Medium Access Control-Command Element (MAC-CE) change can take 3 milliseconds. Either request can be much faster than the time it takes to establish a new LPP positioning session (e.g., 100 milliseconds). At 520, the UE 105 can send a response message to the server (e.g., LMF 220) that includes the requested location information according the updated QoS parameters. At 525, the UE 105 can send a second message that indicates a requested new set of one or more of the QoS parameters. The QoS parameters can be the same as the parameters selected in the first message. For example, the server may request an increase in horizontal accuracy for a dense parking area and at some point later, e.g., while the vehicle is on the highway, the server may request a decrease in horizontal accuracy to save on system resources because the high level of accuracy is no longer required on the highway as compared with a parking area. In some embodiments, the second message may indicate a selection of different parameters from the first message. At 530, the UE 105 can send a response message to the server (e.g., LMF 220) that includes the requested location information according the updated QoS parameters. At 535, the UE 105 can continue to send the requested location information.

It is often desirable to know the location of a terminal such as a cellular phone. For example, a location services (LCS) client may desire to know the location of a terminal in the case of an emergency services call or to provide some service to the user of the terminal such as navigation assistance or direction finding. The terms "location" and "position" are synonymous and are used interchangeably herein. In Observed Time Difference of Arrival (OTDOA) based positioning, the mobile station may measure time differences in received signals from a plurality of base stations. Because positions of the base stations are known, the observed time differences may be used to calculate the location of the terminal. To further help location determination, Positioning Reference Signals (PRS) are often provided by a base station (BS) in order to improve OTDOA positioning performance. The measured time difference of arrival of the PRS from a reference cell (e.g. the serving cell) and one or more neighboring cells is known as the Reference Signal Time Difference (RSTD). Using the RSTD measurements, the absolute or relative transmission timing of each cell, and the known position(s) of BS physical transmitting antenna element(s) for the reference and neighboring cells, the UE's position may be calculated.

Technology for supporting reliable and high-speed data service includes Orthogonal Frequency Division Multiplexing (OFDM), Multiple Input Multiple Output (MIMO), and so on. An OFDM system converts symbols, received in series, into N (N is a natural number) parallel symbols and transmits them on respective separated N subcarriers. The subcarriers maintain orthogonality in the frequency domain. MIMO technology can be used to improve the efficiency of data transmission and reception using multiple transmission antennas and multiple reception antennas. MIMO technology includes spatial multiplexing, transmit diversity, beam forming and the like. An MIMO channel matrix according to the number of reception antennas and the number of transmission antennas can be decomposed into a number of independent channels. Each of the independent channels is called a layer or stream. The number of layers is called a rank.

A transceiver capable of transmitting PRS information can be configured to assign a distinct Physical Antenna Port (PAP) identifier (ID) to each physical transmitting antenna element in a plurality of physical transmitting antenna elements serving a single cell; and generate a plurality of PRS sequences, each PRS sequence in the plurality of PRS sequences corresponding to a distinct physical transmitting antenna element in the plurality of physical transmitting antenna elements, wherein each PRS sequence has a corresponding frequency shift based, at least in part, on a corresponding PAP ID (h) of a corresponding physical transmitting antenna element. Therefore the PRS is divided into different frequency layers. Each frequency layer can have one or more associates QoS parameters. The UE 105 can request a different QoS parameters for different Positioning Reference Signal (PRS) frequency layers.

Figure 6:
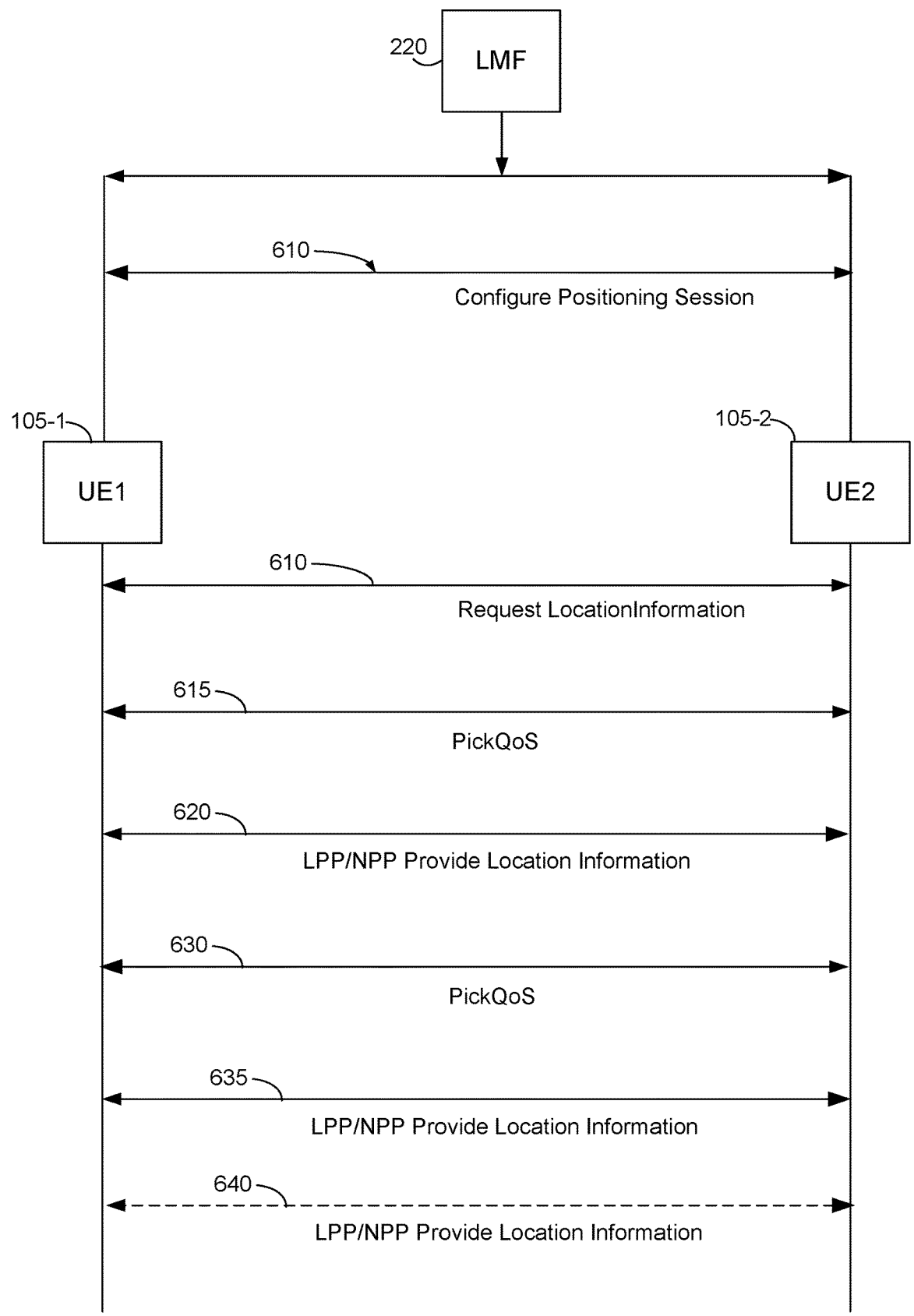
FIG. 6 illustrates a third example information exchange for a dynamic LPP positioning session, according to an embodiment.

FIG. 6 illustrates a third example information exchange for a dynamic LPP positioning session. The example information exchange depicted in FIG. 6 can include Device-to-Device (D2D) communication between multiple user equipment (UE) devices 105-1, 105-2. Device-to-device (D2D) communication is expected to play a significant role in upcoming cellular networks as it promises ultra-low latency for communication among users. The D2D communication can include a ranging session between the devices. The QoS parameters for the ranging session can be adjusted during the ranging session.

Using D2D communication, a large amount of data can be transferred quickly between mobile devices in short range. D2D communication can support local data services very efficiently through unicast, group cast and broadcast transmissions. Example applications include the following Information sharing, Data and computation offloading, coverage extension, and machine-to-machine (M2M) communications.

UEs can leverage D2D links to transfer files, audios and videos with higher data rates and lower energy than those in conventional cellular channels. They facilitate streaming services like Google Chromecast, IPTV, etc. by forming clusters and groupcasting data within a cluster. They also aid in other proximity services like public safety. D2D links can operate unimpeded in a disaster-hit area where all BSs are paralyzed.

Data and computation offloading can be employed with a device with a good Internet connectivity can act as a hotspot to which data is offloaded/cached from the BS and from which other devices may download data using D2D links. UEs having poor processing power or low energy budgets may also offload computation-heavy tasks to nearby more capable UEs using D2D links.

In Coverage extension a UE (e.g., at the cell edge or in a disaster-hit area) may encounter poor signal quality while connecting to the base station. A UE close to it that has, however, a better link to the base station may act as a relay for it. Relays can be used to extend the coverage of cellular service and enable multi-hop communication.

Another way to boost signal strength at a receiver is to relay it via multiple parallel paths, each composed of collaborative devices. These techniques can be referred to as cooperative diversity techniques.

Machine-to-machine (M2M) communication is an enabling technology for Internet-of-Things (IoT). It involves autonomous connectivity and communication among devices ranging from embedded low-power devices to powerful compute-rich devices. D2D connections can be used to establish M2M communication in IoT since they afford ultra-low latency and hence, real-time responses. A particular application is vehicle-to-vehicle (V2V) communication where D2D links can be utilized to share information between neighboring vehicles quickly and offload traffic efficiently. They can also be harnessed for vehicle-to-infrastructure and vehicle-to-pedestrian communication.

The base station or gNB, as it is called in 3GPP, connected to the Evolved Packet Core (EPC), can communicate with a UE directly using cellular communication. Additionally, UEs can communicate via direct D2D links. In terms of channel structure, the direct link between two UEs is called a sidelink which can operate by frequency division duplex or time division duplex. The UEs on being powered up first synchronize with the gNB or other UEs.

In FIG. 6 the server (e.g., LMF 220) can send, at 610, a message to each of the user elements (UEs) 105-1, and 105-2. The message can include configuration information for the positioning session between the user equipment (UE) devices 105-1, 105-2. For example, the server (e.g., LMF 220) can identify that both UEs 105-1 and 105-2 are vehicles. The server can set up the QoS for ranging between the UEs 105-1 and 105-2 (e.g., 1 meter horizontal accuracy every 10 millisecond).

A first UE 105-1 can receive, at 610, a message from a second UE 105-2 requesting location information. Alternatively, the second UE 105-2 can receive, at 610, a message from the first UE 105-1 requesting location information. The message can be made via a sidelink.

In various embodiments, the second UE 105-2, at 615, can send a first message to the first UE 105-1 that indicates a selection of one or more of the QoS parameters. Alternatively, the first UE 105-1 can send a message to the second UE 105-2 that indicates a selection of one or more of the QoS parameters. For example, the second UE 105-2 may request higher horizontal accuracy, for example, half-meter accuracy. Therefore, the message would include the request for adjusting the higher level of horizontal accuracy.

At 620, the first UE 105-1 can send a response message to the second user equipment UE 105-2 that includes the requested location information according the updated QoS parameters. Alternatively, the second UE 105-2 can send a response message to the first UE 105-1 that includes the requested location information according to the updated QoS parameters. The response message can be sent via a sidelink.

At 630, the first UE 105-1 can receive a second message from the second UE 105-2 that indicates a selection of one or more of the QoS parameters. The QoS parameters can be the same as the parameters selected in the first message. For example, the server may request an increase in horizontal accuracy for a dense parking area and at some point later, e.g., while the vehicle is on the highway, the server may request a decrease in horizontal accuracy to save on system resources because the high level of accuracy is no longer required on the highway as compared with a parking area. In some embodiments, the second message may indicate a selection of different parameters from the first message. Alternatively at 630, the second UE 105-2 can receive a second message from the first UE 105-1 that indicates a selection of one or more of the QoS parameters.

At 635, the first UE 105-1 can send a second response message to the second UE 105-2 that includes the requested location information according to the updated QoS parameters. Alternatively, the second UE 105-2 can send a second response message to the first UE 105-1 that includes the requested location information according to the updated QoS parameters.

At 640, the first UE 105-1 can continue to send the requested location information to the second UE 105-2. Alternatively, at 640, the second UE 105-2 can continue to send the requested location information to the first UE 105-1.

Figure 7:
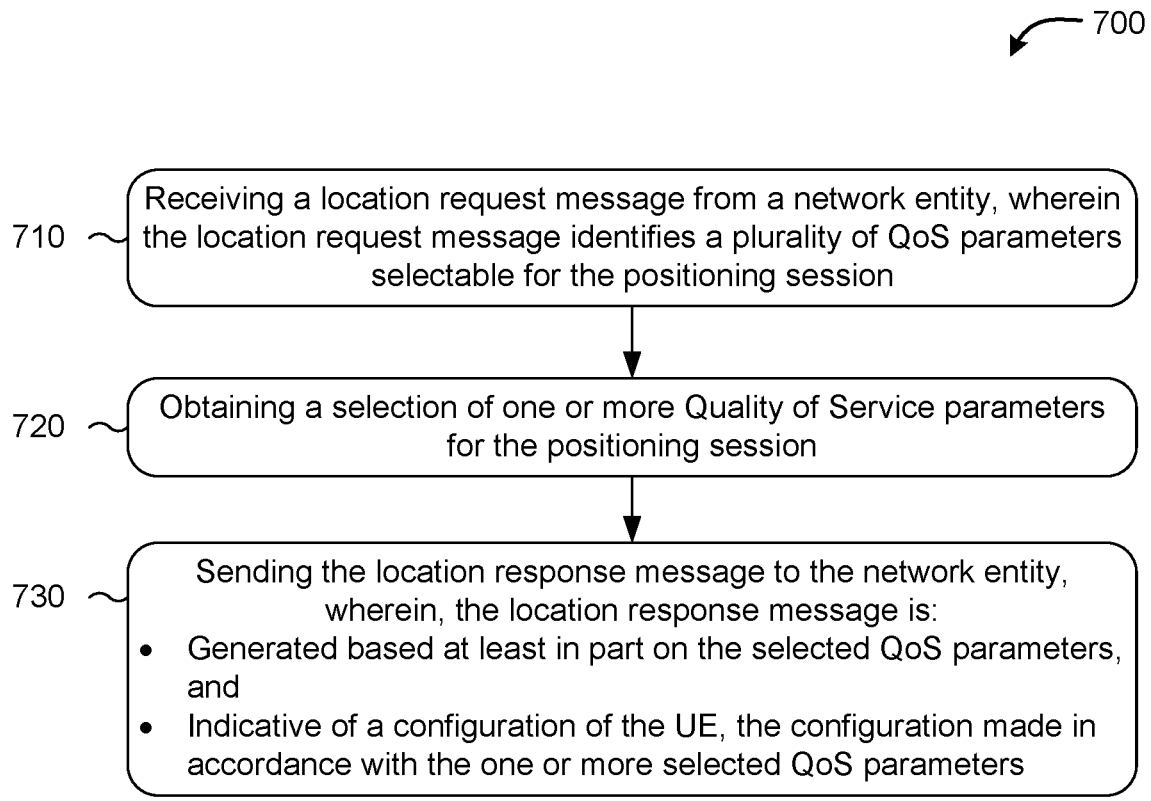
FIG. 7 illustrates is a flow diagram illustrating a method for a UE for dynamically configuring a LPP positioning session, according to an embodiment.
Figure 9:
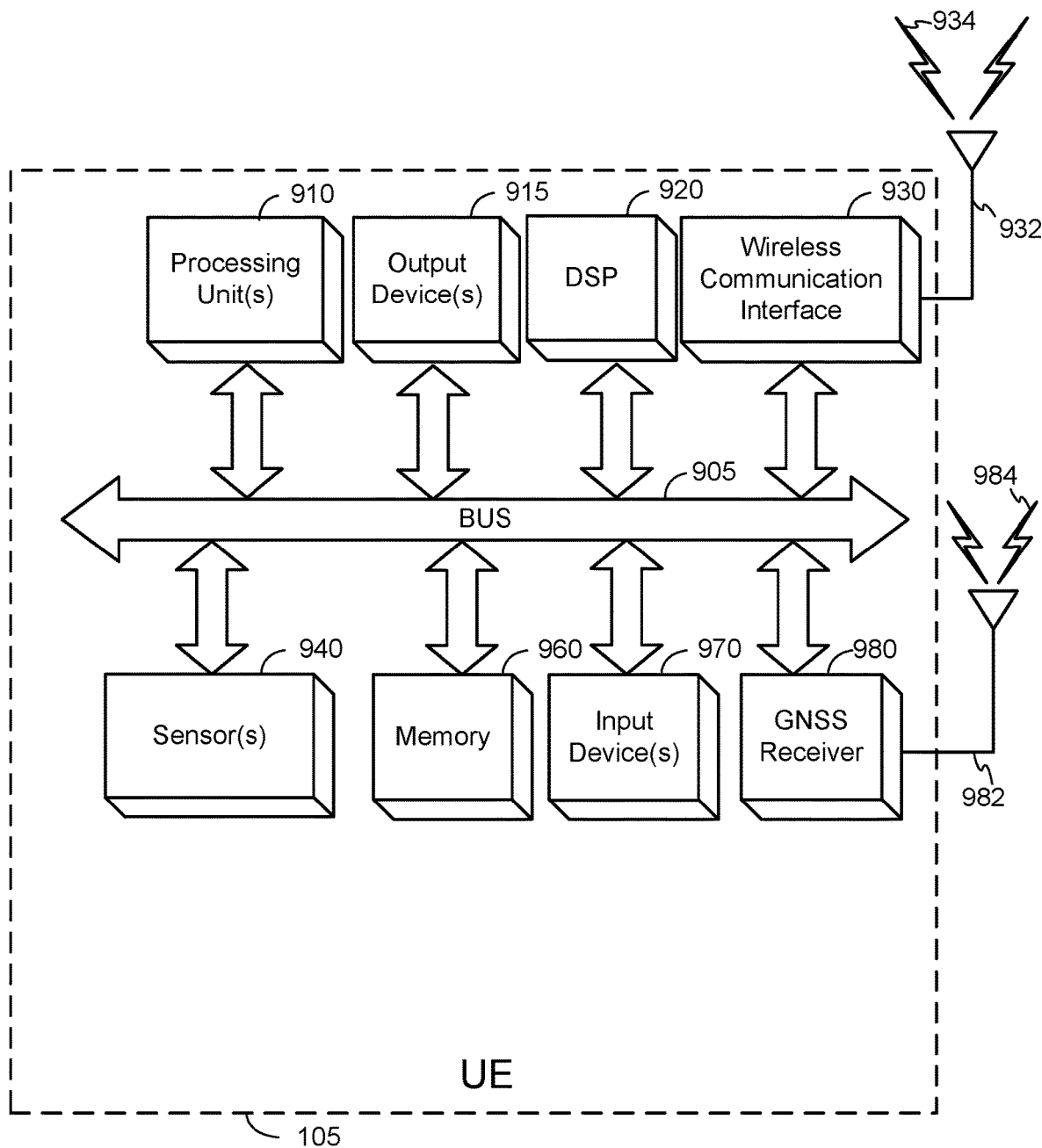
FIG. 9 is a block diagram of an embodiment of a user equipment (UE) device.

FIG. 7 is a flow chart of an example process 700 for techniques for dynamically configuring one or more Quality of Service (QoS) parameters during a positioning session performed at a user equipment, according to an embodiment. In various embodiments the positioning session can be an LTE Positioning Protocol (LPP) positioning session. In some implementations, one or more process blocks of FIG. 7 may be performed by a UE 105. In some implementations, one or more process blocks of FIG. 7 may be performed by another device or a group of devices separate from or including the UE 105. Example components of a UE 105 are illustrated in FIG. 9 and discussed hereafter.

At 710, process 700 may include receiving a location request message from a network entity. The network entity can be a server, e.g., LMF 220 as shown in FIG. 2, wherein the location request message identifies a plurality of QoS parameters for the positioning session. For example, the UE 105 (e.g., using processor 910, memory 960, input device 970, output device 915, communication interface 930, GNSS receiver 980, GNSS antenna 982 and/or the like) may receive a location request message from a network entity such as a server (e.g., LMF 220 as shown in FIG. 2), as described above. The network entity may also comprise another user equipment, as previously described with regard to FIG. 6. In some implementations, the location request message identifies a plurality of QoS parameters for the positioning session. Example QoS parameters are described above.

At 720, process 700 may include obtaining a selection of one or more QoS parameters for the positioning session. For example, the UE 105 (e.g., using processor 910, memory 960, input device 970, output device 915, communication interface 930, GNSS receiver 980, GNSS antenna 982, and/or the like) may receive a selection of one or more QoS parameters for the positioning session, as described above. A network entity (e.g., LMF 220) may receive a service request from some external client that is a positioning request for a specific use-case, for example an E911 call. An E911 call has a relatively low requirements with regards to accuracy (e.g., 50 meters horizontal accuracy), whereas if the request is for a commercial requirement, (or specific application, like google maps, etc.), the requirements of accuracy or latency may be different. The LMF 220 may receive multiple requests, each one associated with different QoS. Then the LMF 220 may configure multiple such QoS. Alternatively, there can be an app (or client) at the UE 105 which ask for a specific QoS. Then the UE 105 may request specific QoS according to these internal requests The process 700 can include determining the one or more QoS parameters for the positioning session using at least one of downlink control information (DCI) and MAC-CE commands.

As previously indicated, one or more QoS parameters can include one or more enumerated values (or multiple QoS containers) that may be selected during a positioning session. According to some embodiments, having multiple values of the QOS parameters may be applicable for periodic positioning sessions. For example, periodic reporting can occur when periodicalReporting is ON or when the reportingAmount is set to "infinite/indefinite".

The one or more QoS parameters can specify layer-specific QoS parameters for one or more frequency layers of a Positioning Reference Signal (PRS).

At 730, process 700 may include sending the location response message to the network entity, wherein, the location response message is (i) generated based at least in part on the selected QoS parameters, and (ii) indicative of a configuration of the UE, the configuration made in accordance with the one or more selected QoS parameters. For example, the UE may receive a QoS selection from a network entity (as shown in block in 720), and may then perform measurements to try to meet the updated QoS parameters. For example, the UE 105 may process more PRS resources per TRP, or process more sets per TRP, or request different configuration of Measurement Gaps, to try to meet the updated QoS parameters. The UE 105 may switch on additional sensors (e.g. if the QoS asks for vertical accuracy, it may switch on the barometer, or request for an Angle-based method to try to derive the vertical accuracy). If for example, shorter response time is requested, the UE may dedicate more computation resources to process the PRS resources faster. For example, the UE 105 (e.g., using processor 910, memory 960, input device 970, output device 915, communication interface 930, GNSS receiver 980, GNSS antenna 982 and/or the like) may configure the UE 105 according to the one or more selected QoS parameters, as described above.

The location response message can be generated in accordance with the selected QoS parameters. For example, the UE 105 (e.g., using processor 910, memory 960, input device 970, output device 915, communication interface 930, GNSS receiver 980, GNSS antenna 982 and/or the like) may generate a location response message, as described above. Additionally or alternatively the UE 105 (e.g., using processor 910, memory 960, input device 970, output device 915, communication interface 930, GNSS receiver 980, GNSS antenna 982 and/or the like) may send the location response message to the network entity, as described herein.

Process 700 may include additional implementations, such as any single implementation or any combination of implementations described below and/or in connection with one or more other processes described elsewhere herein.

In some implementations, obtaining the selection of the one or more QoS parameters comprises receiving a selection from a server for making the selection with the UE. Accordingly, in these implementations, obtaining the selection can be made by the UE 105.

In some implementations, the location response message comprises a QoS feedback parameter that indicates the QoS attainable by the UE 105. For example, if the QoS parameter for horizontal accuracy is set at 10 meters, but only 20 meters accuracy is possible due to one or more other constraints (i.e., processing bandwidth, receiver signal strength, etc.) the system will return responses with 20 meters accuracy. The response message can include a feedback parameter informing the server or another UE that the system can only attain 20 meter horizontal accuracy.

In some implementations, the QoS parameter comprises a horizontal accuracy parameter that indicates a maximum horizontal error in a location estimate at an indicated confidence level, a vertical coordinate request that indicates whether a vertical coordinate is required as part of the location response message, a vertical accuracy parameter that indicates a maximum vertical error in a location estimate at an indicated confidence level, a response time that indicates a maximum elapsed time between receipt of the location request message and the sending of the location response message, a response time early fix parameter that indicates a maximum elapsed time between receipt of the location request message and the sending of the location response message containing an early location measurement, or a velocity request parameter, wherein the velocity request parameter indicates whether velocity is requested, or a combination thereof. According to some embodiments, the lower the maximum horizontal error is, the more precise the horizontal position. A vertical coordinate parameter can be binary as requested (TRUE) or not (FALSE). With regard to the maximum vertical error, the lower the maximum vertical error is, the more precise the vertical position. With regard to the response time early fix parameter, if a unit field is absent, this may be given as an integer number of seconds between 1 and 128. If the unit field is present, the maximum response time may be given in units of 10-seconds, between 10 and 1280 seconds. With regard to the velocity request parameter, this parameter can be binary as requested (TRUE) or not (FALSE).

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
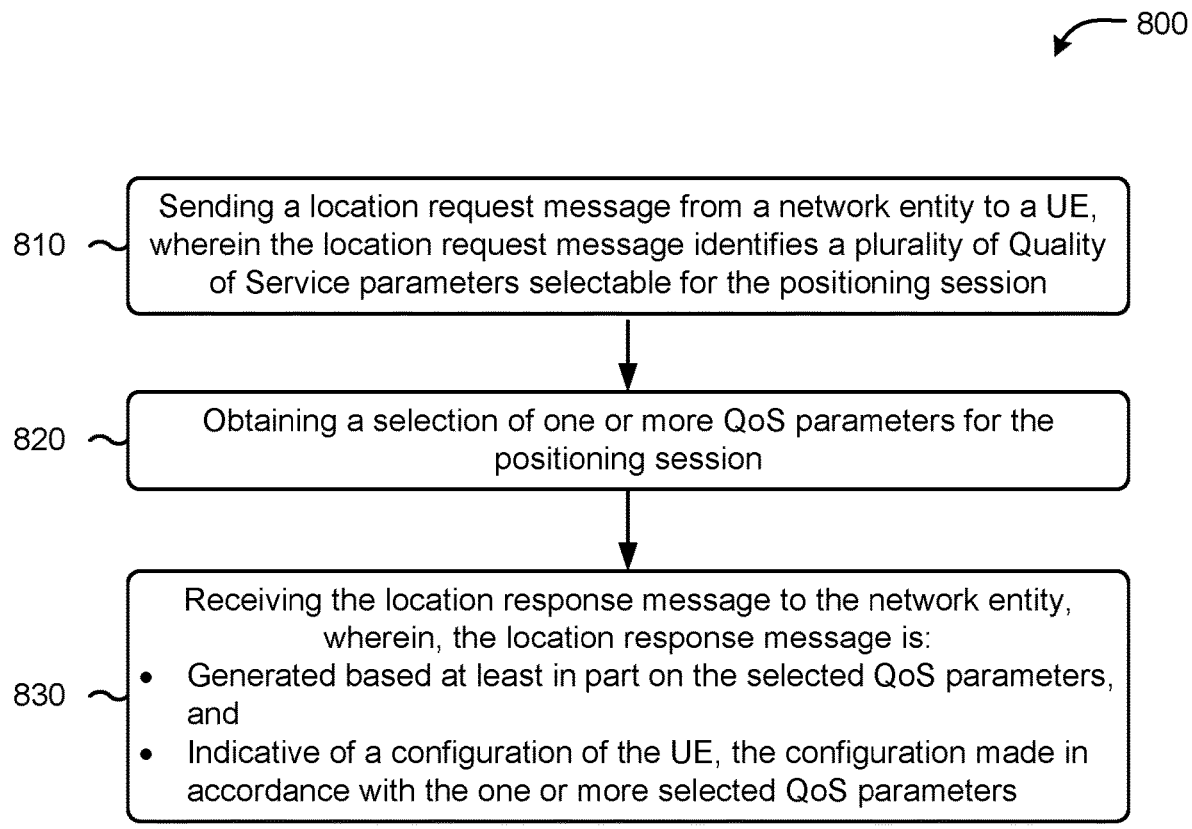
FIG. 8 illustrates is a flow diagram illustrating a method for a server for dynamically configuring a LPP positioning session, according to an embodiment.

FIG. 8 is a flow chart of an example process 800 for dynamically configuring one or more Quality of Service (QoS) parameters during a positioning session performed at a network entity, according to an embodiment. The positioning session can be a LTE Positioning Protocol (LPP) session. In some implementations, one or more process blocks of FIG. 8 may be performed by a network entity. The network entity can be a server or another user equipment. In some implementations, one or more process blocks of FIG. 8 may be performed by another device or a group of devices separate from or including the network entity.

At 810, process 800 may include sending a location request message to a UE 105, wherein the location request message identifies a plurality of QoS parameters for the positioning session. For example, the network entity (e.g., using processor 1010, memory 1035, input device 1015, output device 1020, communication subsystem 1030, wireless communication interface 1033 and/or the like) may send a location request message to a UE 105, as described above. In some implementations, the location request message identifies a plurality of QoS parameters for the positioning session as described above.

At 820, process 800 may include obtaining a selection of one or more QoS parameters for the positioning session. For example, the network entity (e.g., using processor 1010, memory 1035, input device 1015, output device 1020, communication subsystem 1030, wireless communication interface 1033 and/or the like) may obtain a selection of one or more QoS parameters for the positioning session, as described above. As indicated in the above-described embodiments, obtaining the selection of the one or more QoS parameters may comprise sending information indicative of the one or more QoS parameters for the positioning session via at least one of downlink control information (DCI) and Medium Access Control-Command Element (MAC-CE) commands. Additionally or alternatively, obtaining the selection of the one or more QoS parameters comprises receiving the selection from the UE or making the selection with the network entity. Some embodiments may include, prior to obtaining the selection of the one or more QoS parameters for the positioning session, sending, to the network entity from the UE, at least one requested QOS parameter to be included in the selection of the one or more QoS parameters.

At 830, process 800 may include receiving the location response message to the network entity, wherein, the location response message is (i) generated based at least in part on the selected QoS parameters, and (ii) indicative of a configuration of the UE, the configuration made in accordance with the one or more selected QoS parameters. For example, the network entity (e.g., using processor 1010, memory 1035, input device 1015, output device 1020, communication subsystem 1030, wireless communication interface 1033 and/or the like) may receive a location response message generated by the UE 105 according to the one or more QoS parameters, as described above.

Process 800 may include additional implementations, such as any single implementation or any combination of implementations described below and/or in connection with one or more other processes described elsewhere herein.

In some implementations, the location response message comprises a QoS feedback parameter, the feedback parameter indicates the QoS attainable by the UE 105. For example, if the QoS parameter for horizontal accuracy is set at 10 meters, but only 20 meters accuracy is possible due to one or more other constraints (i.e., processing bandwidth, receiver signal strength, etc.) the system will return responses with 20 meters accuracy. The response message can include a feedback parameter informing the server or another UE that the system can only attain 20 meter horizontal accuracy.

In some implementations, the location request message specifies layer-specific QoS parameters for one or more frequency layers of a PRS.

In some implementations, the QoS parameter comprises a horizontal accuracy parameter that indicates a maximum horizontal error in a location estimate at an indicated confidence level, a vertical coordinate request that indicates whether a vertical coordinate is required as part of the location response message, a vertical accuracy parameter that indicates a maximum vertical error in a location estimate at an indicated confidence level, a response time that indicates a maximum elapsed time between receipt of the location request message and the sending of the location response message, a response time early fix parameter that indicates a maximum elapsed time between receipt of the location request message and the sending of the location response message containing an early location measurement, or a velocity request parameter, wherein the velocity request parameter indicates whether velocity is requested, or a combination thereof. According to some embodiments, the lower the maximum horizontal error is, the more precise the horizontal position. A vertical coordinate parameter can be binary as requested (TRUE) or not (FALSE). With regard to the maximum vertical error, the lower the maximum vertical error is, the more precise the vertical position. With regard to the response time early fix parameter, if a unit field is absent, this may be given as an integer number of seconds between 1 and 128. If the unit field is present, the maximum response time may be given in units of 10-seconds, between 10 and 1280 seconds. With regard to the velocity request parameter, this parameter can be binary as requested (TRUE) or not (FALSE).

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

FIG. 9 illustrates an embodiment of a UE 105, which can be utilized as described herein above (e.g., in association with FIGS. 1-8). For example, the UE 105 can perform one or more of the functions of the UE described in the method shown in FIG. 7 and/or network entity described in the method shown in FIG. 8. It should be noted that FIG. 9 is meant only to provide a generalized illustration of various components, any or all of which may be utilized as appropriate. It can be noted that, in some instances, components illustrated by FIG. 9 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 9.

The UE 105 is shown comprising hardware elements that can be electrically coupled via a bus 905 (or may otherwise be in communication, as appropriate). The hardware elements may include a processor(s) 910 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 910 may comprise one or more processing units, which may be housed in a single integrated circuit (IC) or multiple ICs. As shown in FIG. 9, some embodiments may have a separate DSP 920, depending on desired functionality. Location determination and/or other determinations based on wireless communication may be provided in the processor(s) 910 and/or wireless communication interface 930 (discussed below). The UE 105 also can include one or more input devices 970, which can include without limitation one or more keyboards, touch screens, touch pads, microphones, buttons, dials, switches, and/or the like; and one or more output devices 915, which can include without limitation one or more displays (e.g., touch screens), light emitting diodes (LEDs), speakers, and/or the like.

The UE 105 may also include a wireless communication interface 930, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. The wireless communication interface 930 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 932 that send and/or receive wireless signals 934. According to some embodiments, the wireless communication antenna(s) 932 may comprise a plurality of discrete antennas, antenna arrays, or any combination thereof. The antenna(s) 932 may be capable of transmitting and receiving wireless signals using beams (e.g., Tx beams and Rx beams). Beam formation may be performed using digital and/or analog beam formation techniques, with respective digital and/or analog circuitry. The wireless communication interface 930 may include such circuitry.

Depending on desired functionality, the wireless communication interface 930 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 940. Sensor(s) 940 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information, as described herein.

Embodiments of the UE 105 may also include a Global Navigation Satellite System (GNSS) receiver 980 capable of receiving signals 984 from one or more GNSS satellites using an antenna 982 (which could be the same as antenna 932). Positioning based on GNSS signal measurement can be utilized to complement and/or incorporate the techniques described herein. The GNSS receiver 980 can extract a position of the UE 105, using conventional techniques, from GNSS satellites 110 of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 980 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 980 is illustrated in FIG. 9 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 910, DSP 920, and/or a processor within the wireless communication interface 930 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 910 or DSP 920.

The UE 105 may further include and/or be in communication with a memory 960. The memory 960 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 960 of the UE 105 also can comprise software elements (not shown in FIG. 9), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 960 that are executable by the UE 105 (and/or processor(s) 910 or DSP 920 within UE 105). In some embodiments, then, such code and/or instructions can be used to configure and/or adapt a general-purpose computer (or other device) to perform one or more operations in accordance with the described methods.

Figure 10:
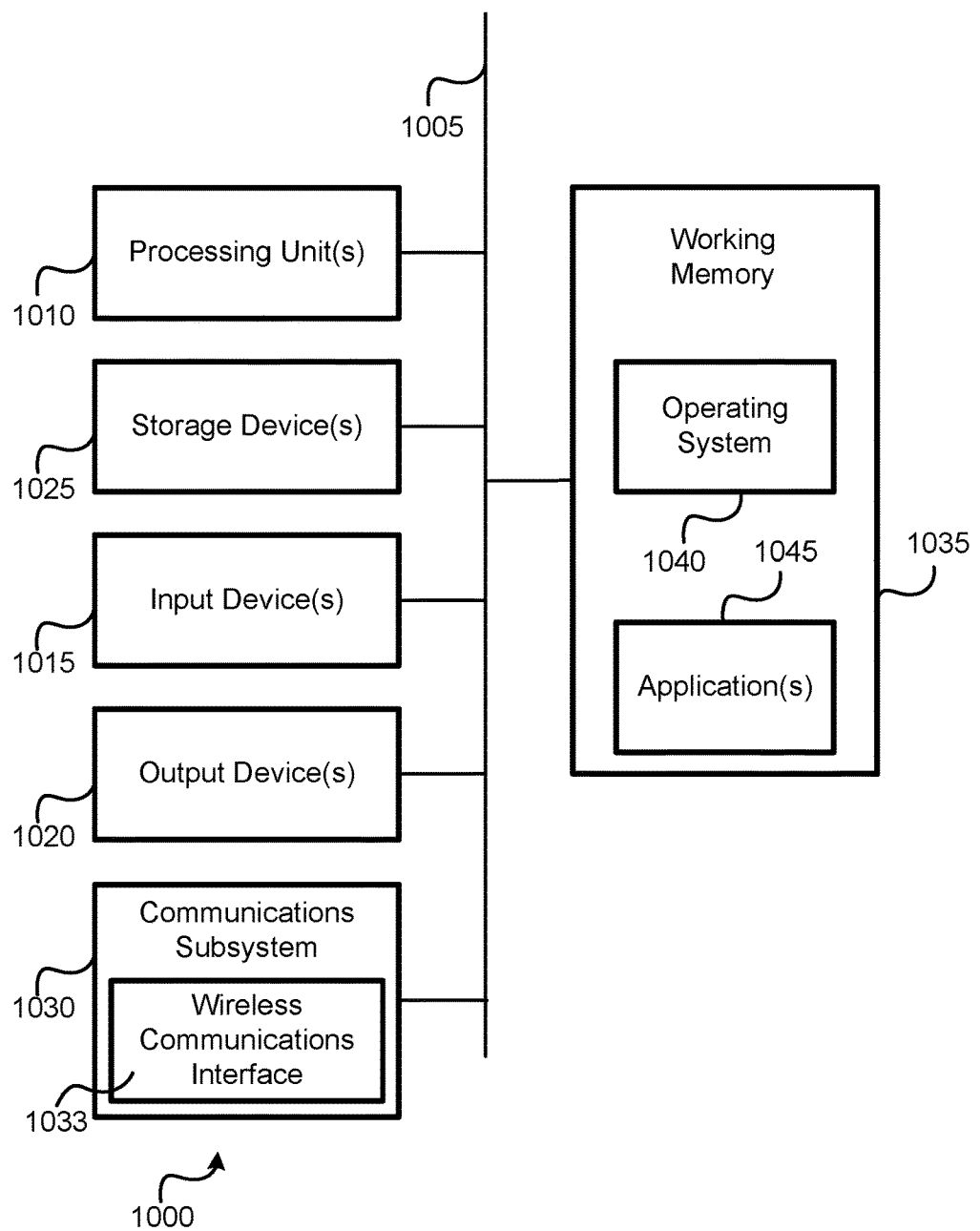
FIG. 10 is a block diagram of an embodiment of a computer system (e.g., a server).

FIG. 10 is a block diagram of an embodiment of a computer system 1000, which may be used, in whole or in part, to provide the functions of one or more network components a network entity as described in the embodiments herein (e.g., location server 160 of FIG. 1, LMF 220 of FIG. 2), including various components of a 5G network, such as the NG-RAN 235, 5GCN 240, and/or similar components of other network types. Additionally or alternatively, one or more of the components shown in FIG. 10 may be utilized in a UE. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner. In addition, it can be noted that components illustrated by FIG. 10 can be localized to a single device and/or distributed among various networked devices, which may be disposed at different physical or geographical locations. In some embodiments, the computer system 1000 may correspond to an LMF 220, a gNB 210 (e.g. gNB 210-1), an ng-eNB 214, a WLAN 216, an eNB, another cellular or non-cellular access node, an E-SMLC, a SUPL SLP and/or some other type of location-capable device.

The computer system 1000 is shown comprising hardware elements that can be electrically coupled via a bus 1005 (or may otherwise be in communication, as appropriate). The hardware elements may include processor(s) 1010, which may comprise without limitation one or more general-purpose processors, one or more special-purpose processors (such as digital signal processing chips, graphics acceleration processors, and/or the like), and/or other processing structure, which can be configured to perform one or more of the methods described herein, including the method described in relation to FIG. 10. The computer system 1000 also may comprise one or more input devices 1015, which may comprise without limitation a mouse, a keyboard, a camera, a microphone, and/or the like; and one or more output devices 1020, which may comprise without limitation a display device, a printer, and/or the like.

The computer system 1000 may further include (and/or be in communication with) one or more non-transitory storage devices 1025, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1000 may also include a communications subsystem 1030, which may comprise wireless communication technologies managed and controlled by a wireless communication interface 1033, as well as wired technologies (such as Ethernet, coaxial communications, universal serial bus (USB), and the like). The wireless communication interface 1033 may comprise one or more wireless transceivers may send and receive wireless signals 1055 (e.g., signals according to 5G NR or LTE) via wireless antenna(s) 1050. Thus the communications subsystem 1030 may comprise a modem, a network card (wireless or wired), an infrared communication device, a wireless communication device, and/or a chipset, and/or the like, which may enable the computer system 1000 to communicate on any or all of the communication networks described herein to any device on the respective network, including a User Equipment (UE), base stations and/or other TRPs, and/or any other electronic devices described herein. Hence, the communications subsystem 1030 may be used to receive and send data as described in the embodiments herein.

In many embodiments, the computer system 1000 will further comprise a working memory 1035, which may comprise a RAM or ROM device, as described above. Software elements, shown as being located within the working memory 1035, may comprise an operating system 1040, device drivers, executable libraries, and/or other code, such as one or more applications 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1025 described above. In some cases, the storage medium might be incorporated within a computer system, such as computer system 1000. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

Figure 11:
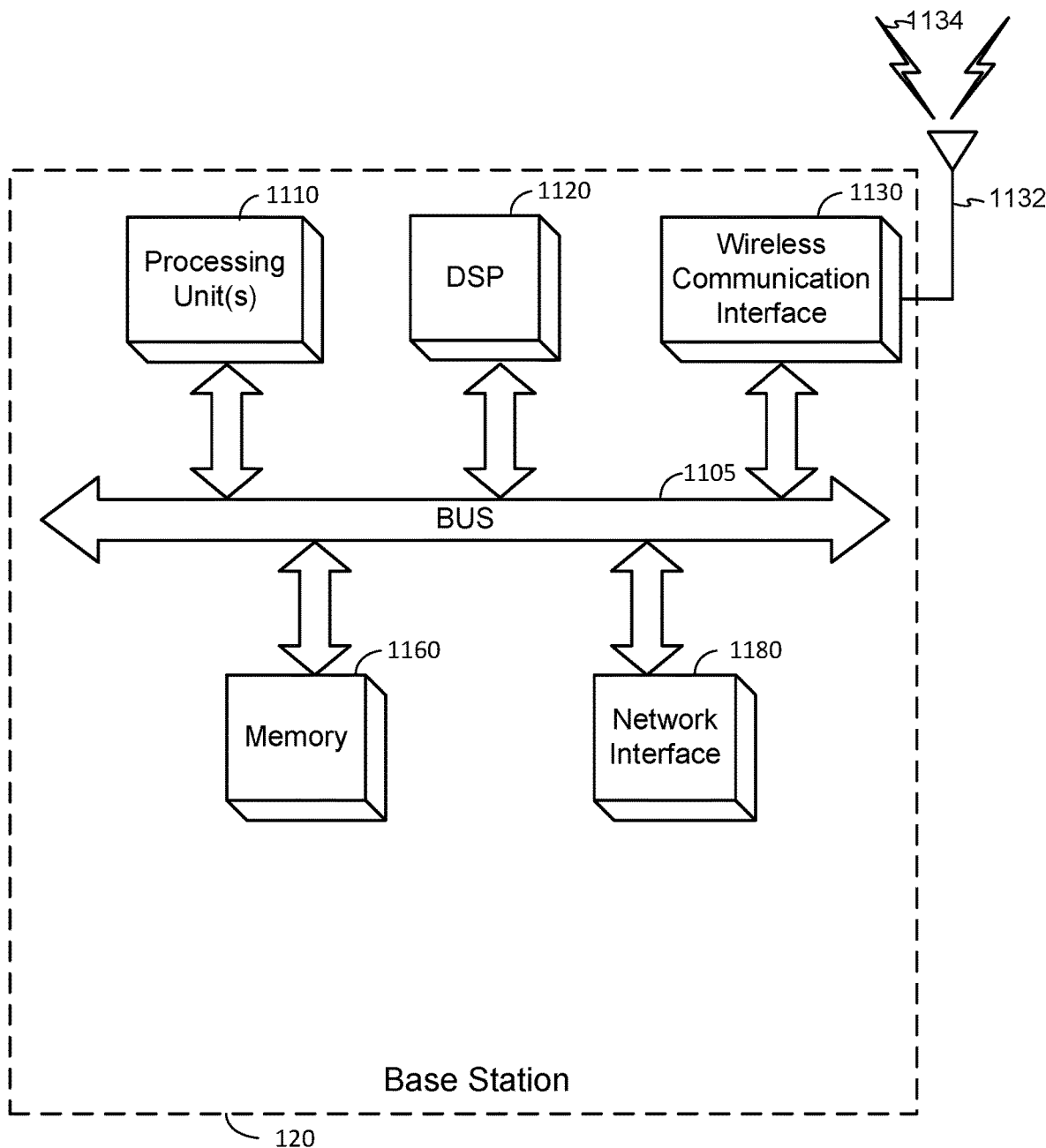
FIG. 11 is a block diagram of an embodiment of a base station.

FIG. 11 illustrates an embodiment of a base station 120, which can be utilized as described herein above (e.g., in association with FIGS. 1-9). It should be noted that FIG. 11 is meant only to provide a generalized illustration of various components, any or all of which may be utilized as appropriate. In some embodiments, the base station 120 may correspond to a gNB, an ng-eNB, and/or (more generally) a TRP.

The base station 120 is shown comprising hardware elements that can be electrically coupled via a bus 1105 (or may otherwise be in communication, as appropriate). The hardware elements may include a processing unit(s) 1110 which can include without limitation one or more general-purpose processors, one or more special-purpose processors (such as DSP chips, graphics acceleration processors, ASICs, and/or the like), and/or other processing structure or means. As shown in FIG. 11, some embodiments may have a separate DSP 1120, depending on desired functionality. Location determination and/or other determinations based on wireless communication may be provided in the processing unit(s) 1110 and/or wireless communication interface 1130 (discussed below), according to some embodiments. The base station 120 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 120 might also include a wireless communication interface 1130, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 120 to communicate as described herein. The wireless communication interface 1130 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 1132 that send and/or receive wireless signals 1134.

The base station 120 may also include a network interface 1180, which can include support of wireline communication technologies. The network interface 1180 may include a modem, network card, chipset, and/or the like. The network interface 1180 may include one or more input and/or output communication interfaces to permit data to be exchanged with a network, communication network servers, computer systems, and/or any other electronic devices described herein.

In many embodiments, the base station 120 may further comprise a memory 1160. The memory 1160 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1160 of the base station 120 also may comprise software elements (not shown in FIG. 11), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1160 that are executable by the base station 120 (and/or processing unit(s) 1110 or DSP 1120 within base station 120). In an aspect, then such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

In view of this description embodiments may include different combinations of features. Implementation examples are described in the following numbered clauses:

Clause 1: A method of dynamically configuring one or more Quality of Service (QoS) parameters during a positioning session performed at a user equipment (UE), the method comprising: receiving a location request message from a network entity, wherein the location request message identifies the one or more QoS parameters selectable for the positioning session; obtaining a selection of the one or more QoS parameters for the positioning session; and sending a location response message to the network entity, wherein, the location response message is: generated based at least in part on the selected QoS parameters, and indicative of a configuration of the UE, the configuration made in accordance with the one or more selected QoS parameters.

Clause 2: The method of clause 1, wherein the positioning session comprises an LTE Positioning Protocol (LPP) positioning session.

Clause 3: The method of any of clauses 1-2 wherein the network entity comprises a server or another UE.

Clause 4: The method any of clauses 1-3 wherein obtaining the selection of the one or more QoS parameters comprises determining the one or more QoS parameters for the positioning session using at least one of downlink control information (DCI) and Medium Access Control-Command Element (MAC-CE) commands.

Clause 5: The method of any of clauses 1-4 wherein the one or more QoS parameters include one or more enumerated values of at least one of the QOS parameters.

Clause 6: The method of any of clauses 1-5 wherein obtaining the selection of the one or more QoS parameters comprises receiving the selection from a server.

Clause 7: The method of any of clauses 1-6 further comprising, prior to obtaining the selection of the one or more QoS parameters for the positioning session, sending, to the network entity from the UE, at least one requested QOS parameter to be included in the selection of the one or more QoS parameters.

Clause 8: The method of any of clauses 1-7 wherein the location request message specifies layer-specific QoS parameters for one or more frequency layers of a Positioning Reference Signal (PRS).

Clause 9: The method of any of clauses 1-8 wherein the location response message comprises a QoS feedback parameter that indicates a QoS attainable by the UE.

Clause 10: The method of any of clauses 1-9 wherein at least one of the one or more the QoS parameters comprises: a horizontal accuracy parameter that indicates a maximum horizontal error in a location estimate at an indicated confidence level, a vertical coordinate request that indicates whether a vertical coordinate is required as part of the location response message, a vertical accuracy parameter that indicates a maximum vertical error in a location estimate at an indicated confidence level, a response time that indicates a maximum elapsed time between receipt of the location request message and the sending of the location response message, a response time early fix parameter that indicates a maximum elapsed time between receipt of the location request message and the sending of the location response message containing an early location measurement, or a velocity request parameter, wherein the velocity request parameter indicates whether velocity is requested, or a combination thereof.

Clause 11: A method of dynamically configuring one or more Quality of Service (QoS) parameters during a positioning session performed at a network entity, the method comprising: sending a location request message from the network entity to a user equipment (UE), wherein the location request message identifies the one or more QoS parameters selectable for the positioning session; obtaining a selection of the one or more QoS parameters for the positioning session; and receiving a location response message to the network entity, wherein, the location response message is: generated based at least in part on the selected QoS parameters, and indicative of a configuration of the UE, the configuration made in accordance with the one or more selected QoS parameters.

Clause 12: The method of clause 11, wherein the positioning session comprises an LTE Positioning Protocol (LPP) positioning session.

Clause 13: The method of any of clauses 11-12 wherein the network entity comprises a server or another UE.

Clause 14: The method any of clauses 11-13 wherein obtaining the selection of the one or more QoS parameters comprises sending information indicative of the one or more QoS parameters for the positioning session via at least one of downlink control information (DCI) and Medium Access Control-Command Element (MAC-CE) commands.

Clause 15: The method of any of clauses 11-14 wherein the one or more QoS parameters include one or more enumerated values of at least one of the QOS parameters.

Clause 16: The method of any of clauses 11-15 wherein obtaining the selection of the one or more QoS parameters comprises making the selection with the network entity.

Clause 17: The method of any of clauses 11-16 further comprising, prior to obtaining the selection of the one or more QoS parameters for the positioning session, receiving, at the network entity from the UE, at least one requested QOS parameter to be included in the selection of the one or more QoS parameters.

Clause 18: The method of any of clauses 11-17 wherein the location request message specifies layer-specific QoS parameters for one or more frequency layers of a Positioning Reference Signal (PRS).

Clause 19: The method of any of clauses 11-18 wherein the location response message comprises a QoS feedback parameter that indicates a QoS attainable by the UE.

Clause 20: The method of any of clauses 11-19 wherein at least one of the one or more the QoS parameters comprises: a horizontal accuracy parameter that indicates a maximum horizontal error in a location estimate at an indicated confidence level, a vertical coordinate request that indicates whether a vertical coordinate is required as part of the location response message, a vertical accuracy parameter that indicates a maximum vertical error in a location estimate at an indicated confidence level, a response time that indicates a maximum elapsed time between receipt of the location request message and the sending of the location response message, a response time early fix parameter that indicates a maximum elapsed time between receipt of the location request message and the sending of the location response message containing an early location measurement, or a velocity request parameter, wherein the velocity request parameter indicates whether velocity is requested, or a combination thereof.

Clause 21: A user equipment (UE) for dynamically configuring one or more Quality of Service (QoS) parameters during a positioning session, the UE comprising: a transceiver; a memory; and one or more processors communicatively coupled with the transceiver and the memory, wherein the one or more processors are configured to perform the method of any of clauses 1-10.

Clause 22: A network entity for dynamically configuring one or more Quality of Service (QoS) parameters during a positioning session, the network entity comprising: a transceiver; a memory; and one or more processors communicatively coupled with the transceiver and the memory, wherein the one or more processors are configured to perform the method of any of clauses 11-20.

Clause 23: An apparatus for dynamically configuring one or more Quality of Service (QoS) parameters during a positioning session performed at a user equipment (UE), the apparatus comprising means for to perform the method of any of clauses 1-20.

Clause 24: A non-transitory computer-readable medium storing instructions for dynamically configuring one or more Quality of Service (QoS) parameters during a positioning session, the instructions comprising code for to perform the method of any of clauses 1-20.

What is claimed is:

1. A method of dynamically configuring one or more Quality of Service (QOS) parameters during a positioning session performed at a user equipment (UE), the method comprising:
   receiving, at the UE, a location request message from a network entity, wherein the location request message identifies the one or more QoS parameters selectable for the positioning session;
   subsequent to receiving the location request message, obtaining, at the UE, a selection of the one or more QoS parameters for the positioning session; and
   sending a location response message from the UE to the network entity, wherein, the location response message is:

generated based at least in part on the selected QoS parameters, and indicative of a configuration of the UE, the configuration made in accordance with the one or more selected QoS parameters.

2. The method of claim 1, wherein the positioning session comprises an LTE Positioning Protocol (LPP) positioning session.

3. The method of claim 1, wherein the network entity comprises a server or another UE.

4. The method claim 1, wherein obtaining the selection of the one or more QOS parameters comprises determining the one or more QoS parameters for the positioning session using at least one of downlink control information (DCI) and Medium Access Control-Command Element (MAC-CE) commands.

5. The method of claim 1, wherein the one or more QoS parameters include one or more enumerated values of at least one of the QOS parameters.

6. The method of claim 1, wherein obtaining the selection of the one or more QoS parameters comprises receiving the selection from a server.

7. The method of claim 1, further comprising, prior to obtaining the selection of the one or more QoS parameters for the positioning session, sending, to the network entity from the UE, at least one requested QOS parameter to be included in the selection of the one or more QoS parameters.

8. The method of claim 1, wherein the location request message specifies layer-specific QoS parameters for one or more frequency layers of a Positioning Reference Signal (PRS).

9. The method of claim 1, wherein the location response message comprises a QoS feedback parameter that indicates a QoS attainable by the UE.

10. The method of claim 1, wherein at least one of the one or more the QoS parameters comprises:
a horizontal accuracy parameter that indicates a maximum horizontal error in a location estimate at an indicated confidence level,
a vertical coordinate request that indicates whether a vertical coordinate is required as part of the location response message,
a vertical accuracy parameter that indicates a maximum vertical error in a location estimate at an indicated confidence level,
a response time that indicates a maximum elapsed time between receipt of the location request message and the sending of the location response message,
a response time early fix parameter that indicates a maximum elapsed time between receipt of the location request message and the sending of the location response message containing an early location measurement, or
a velocity request parameter, wherein the velocity request parameter indicates whether velocity is requested, or
a combination thereof.

11. A method of dynamically configuring one or more Quality of Service (QOS) parameters during a positioning session performed at a network entity, the method comprising:
sending a location request message from the network entity to a user equipment (UE), wherein the location request message identifies the one or more QoS parameters selectable for the positioning session;
subsequent to sending the location request message, obtaining a selection of the one or more QoS parameters for the positioning session; and receiving a location response message at the network entity from the UE, wherein, the location response message is:
generated based at least in part on the selected QoS parameters, and
indicative of a configuration of the UE, the configuration made in accordance with the one or more selected QoS parameters.

12. The method of claim 11, wherein the positioning session comprises an LTE Positioning Protocol (LPP) positioning session.

13. The method of claim 11, wherein the network entity comprises a server or another UE.

14. The method claim 11, wherein obtaining the selection of the one or more QOS parameters comprises sending information indicative of the one or more QoS parameters for the positioning session via at least one of downlink control information (DCI) and Medium Access Control-Command Element (MAC-CE) commands.

15. The method of claim 11, wherein the one or more QoS parameters include one or more enumerated values of at least one of the QOS parameters.

16. The method of claim 11, wherein obtaining the selection of the one or more QOS parameters comprises making the selection with the network entity.

17. The method of claim 11, further comprising, prior to obtaining the selection of the one or more QoS parameters for the positioning session, receiving, at the network entity from the UE, at least one requested QOS parameter to be included in the selection of the one or more QoS parameters.

18. The method of claim 11, wherein the location request message specifies layer-specific QoS parameters for one or more frequency layers of a Positioning Reference Signal (PRS).

19. The method of claim 11, wherein the location response message comprises a QoS feedback parameter that indicates a QoS attainable by the UE.

20. The method of claim 11, wherein at least one of the one or more the QoS parameters comprises:
a horizontal accuracy parameter that indicates a maximum horizontal error in a location estimate at an indicated confidence level,
a vertical coordinate request that indicates whether a vertical coordinate is required as part of the location response message,
a vertical accuracy parameter that indicates a maximum vertical error in a location estimate at an indicated confidence level,
a response time that indicates a maximum elapsed time between receipt of the location request message and the sending of the location response message,
a response time early fix parameter that indicates a maximum elapsed time between receipt of the location request message and the sending of the location response message containing an early location measurement, or
a velocity request parameter, wherein the velocity request parameter indicates whether velocity is requested, or
a combination thereof.

21. A user equipment (UE) for dynamically configuring one or more Quality of Service (QOS) parameters during a positioning session, the UE comprising:
a transceiver;
a memory; and
one or more processors communicatively coupled with the transceiver and the memory, wherein the one or more processors are configured to:

receive, via the transceiver, a location request message from a network entity, wherein the location request message identifies the one or more QoS parameters selectable for the positioning session;

subsequent to receiving the location request message, obtain a selection of the one or more QoS parameters for the positioning session; and send, via the transceiver, a location response message to the network entity, wherein, the location response message is:
  generated based at least in part on the selected QoS parameters, and
  indicative of a configuration of the UE, the configuration made in accordance with the one or more selected QoS parameters.

22. The UE of claim 21, wherein the positioning session comprises an LTE Positioning Protocol (LPP) positioning session.

23. The UE of claim 21, wherein the network entity comprises a server or another UE.

24. The UE of claim 21, wherein obtaining the selection of the one or more QOS parameters comprises determining the one or more QoS parameters for the positioning session using at least one of downlink control information (DCI) and Medium Access Control-Command Element (MAC-CE) commands.

25. The UE of claim 21, wherein the one or more QoS parameters include one or more enumerated values of at least one of the QOS parameters.

26. The UE of claim 21, wherein the one or more processors are further configured to, prior to obtaining the selection of the one or more QoS parameters for the positioning session, send, to the network entity from the UE, at least one requested QOS parameter to be included in the selection of the one or more QoS parameters.

27. The UE of claim 21, wherein the one or more processors are further configured to include, in the location request message, layer-specific QoS parameters for one or more frequency layers of a Positioning Reference Signal (PRS).

28. The UE of claim 21, wherein the location response message comprises a QOS feedback parameter that indicates a QoS attainable by the UE.

29. A network entity for dynamically configuring one or more Quality of Service (QOS) parameters during a positioning session, the network entity comprising:

a transceiver;
a memory; and
one or more processors communicatively coupled with the transceiver and the memory, wherein the one or more processors are configured to:
  send, via the transceiver, a location request message from the network entity to a user equipment (UE), wherein the location request message identifies the one or more QOS parameters selectable for the positioning session;
  subsequent to sending the location request message, obtain a selection of the one or more QoS parameters for the positioning session; and
  receive, via the transceiver, a location response message at the network entity from the UE, wherein, the location response message is:
    generated based at least in part on the selected QoS parameters, and
    indicative of a configuration of the UE, the configuration made in accordance with the one or more selected QoS parameters.

30. The network entity of claim 29, wherein the positioning session comprises an LTE Positioning Protocol (LPP) positioning session.

31. The network entity of claim 29, wherein the network entity comprises a server or another UE.

32. The network entity of claim 29, wherein, to obtain the selection of the one or more QoS parameters, the one or more processors are configured to send information indicative of the one or more QoS parameters for the positioning session via at least one of downlink control information (DCI) and Medium Access Control-Command Element (MAC-CE) commands.

33. The network entity of claim 29, wherein the one or more QOS parameters include one or more enumerated values of at least one of the QOS parameters.

34. The network entity of claim 29, wherein the one or more processors are further configured to, prior to obtaining the selection of the one or more QoS parameters for the positioning session, receive at least one requested QOS parameter to be included in the selection of the one or more QoS parameters from the UE.

35. The network entity of claim 29, wherein the location request message specifies layer-specific QoS parameters for one or more frequency layers of a Positioning Reference Signal (PRS).

* * * * *